(12) United States Patent
Furuichi et al.

(10) Patent No.: US 9,940,442 B2
(45) Date of Patent: *Apr. 10, 2018

(54) SUPPORTING SECONDARY USE OF CONTENT OF ELECTRONIC WORK

(71) Applicant: INTERNATIONAL BUSINESS MACHINES CORPORATION, Armonk, NY (US)

(72) Inventors: Sanehiro Furuichi, Tokyo (JP); Akira Ohkado, Tokyo (JP); Tomohiro Shioya, Tokyo (JP); Masami Tada, Tokyo (JP); Hiroaki Uetsuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/919,302

(22) Filed: Oct. 21, 2015

(65) Prior Publication Data

US 2016/0117489 A1  Apr. 28, 2016

(30) Foreign Application Priority Data

Oct. 27, 2014  (JP) ................................ 2014-218128

(51) Int. Cl.
*G06F 7/04* (2006.01)
*G06F 13/00* (2006.01)
(Continued)

(52) U.S. Cl.
CPC ...... *G06F 21/105* (2013.01); *G06F 17/30876* (2013.01); *G06F 21/6218* (2013.01)

(58) Field of Classification Search
CPC ........................ G06F 21/105; G06F 17/30876
(Continued)

(56) References Cited

U.S. PATENT DOCUMENTS

| 6,446,093 | B2 | 9/2002 | Tabuchi |
| 6,907,407 | B1 | 6/2005 | Yamanoue et al. |

(Continued)

FOREIGN PATENT DOCUMENTS

| JP | 2002055991 A | 2/2002 |
| JP | 2003078751 A | 3/2003 |

(Continued)

OTHER PUBLICATIONS

Furuichi et al., "Method of Supporting Secondary Use of Content of Electronic Work, and Server Computer for Supporting Secondary Use of Content of Electronic Work and Program Therefor," Japan Application No. 2014-218128, filed Oct. 27, 2014, 113 pgs.

(Continued)

*Primary Examiner* — Ashok Patel
*Assistant Examiner* — Abdullah Almamun
(74) *Attorney, Agent, or Firm* — Robert J. Shatto

(57) ABSTRACT

A technique for supporting secondary use of content of an electronic work. This technique includes receiving, from a user terminal, a use request requesting secondary use of the content of the electronic work, in which a secondary use policy of an author of the electronic work is associated with the electronic work; determining whether the use request satisfies the secondary use policy specified by the author; and transmitting, to the user terminal, together with a unique identifier associated with the use request, content of the electronic work based on the determination or edited content based on the determination.

4 Claims, 21 Drawing Sheets

(51) Int. Cl.
G06F 21/10 (2013.01)
G06F 17/30 (2006.01)
G06F 21/62 (2013.01)

(58) Field of Classification Search
USPC .................................................. 726/1
See application file for complete search history.

(56) References Cited

U.S. PATENT DOCUMENTS

| | | | | |
|---|---|---|---|---|
| 6,983,416 | B1* | 1/2006 | Bae | G06F 17/2247 |
| | | | | 705/6 |
| 7,389,473 | B1* | 6/2008 | Sawicki | G06F 17/211 |
| | | | | 715/237 |
| 7,562,089 | B2* | 7/2009 | Adelmann | G06F 17/30067 |
| 8,095,755 | B2* | 1/2012 | Ashour | G06F 11/2064 |
| | | | | 711/100 |
| 8,417,666 | B2 | 4/2013 | Bailor et al. | |
| 9,319,487 | B2 | 4/2016 | Nagasaka et al. | |
| 2002/0032905 | A1 | 3/2002 | Sherr et al. | |
| 2003/0093565 | A1* | 5/2003 | Berger | H04L 12/5835 |
| | | | | 709/246 |
| 2003/0135466 | A1 | 7/2003 | Wang et al. | |
| 2004/0221234 | A1 | 11/2004 | Imai | |
| 2005/0004893 | A1* | 1/2005 | Sangroniz | G06Q 10/10 |
| 2006/0271494 | A1* | 11/2006 | Ito | G06F 21/10 |
| | | | | 705/59 |
| 2007/0031046 | A1* | 2/2007 | Onishi | G06F 17/30011 |
| | | | | 382/232 |
| 2007/0220260 | A1* | 9/2007 | King | G06F 21/64 |
| | | | | 713/176 |
| 2010/0039659 | A1 | 2/2010 | Suzuki | |
| 2011/0051172 | A1* | 3/2011 | Nakanowatari | H04N 1/00244 |
| | | | | 358/1.14 |
| 2011/0141513 | A1* | 6/2011 | Nakanowatari | H04N 1/32117 |
| | | | | 358/1.15 |
| 2011/0231322 | A1* | 9/2011 | Meyer | G06F 21/10 |
| | | | | 705/310 |
| 2013/0179370 | A1 | 7/2013 | Fujimori | |
| 2013/0318635 | A1 | 11/2013 | Verner | |
| 2013/0326640 | A1* | 12/2013 | Nun | G06F 21/604 |
| | | | | 726/30 |
| 2014/0033013 | A1* | 1/2014 | Shaver | G06F 17/24 |
| | | | | 715/230 |
| 2014/0208391 | A1* | 7/2014 | Farnsworth | H04L 51/28 |
| | | | | 726/4 |
| 2015/0113390 | A1* | 4/2015 | Vagell | G06F 17/212 |
| | | | | 715/255 |

FOREIGN PATENT DOCUMENTS

| | | |
|---|---|---|
| JP | 2004118324 A | 4/2004 |
| JP | 2006120016 A | 5/2006 |
| JP | 2006331028 A | 12/2006 |
| JP | 2009205674 A | 9/2009 |
| JP | 2009305674 A | 9/2009 |
| JP | 2013528885 A | 7/2013 |

OTHER PUBLICATIONS

Furuichi et al., "Supporting Secondary Use of Content of Electronic Work," U.S. Appl. No. 15/366,373, filed Dec. 1, 2016.
List of IBM Patents or Patent Applications Treated as Related, Nov. 29, 2016, 2 pgs.
Notification of Reasons for Refusal, Japan Application No. 2014-218128, dated Aug. 1, 2016, 3 pgs.
Written Argument, Japan Application No. 2014-218128, updated Oct. 17, 2016, translated Nov. 22, 2016, 2 pgs.
Written Amendment, Japan Application No. 2014-218128, updated Oct. 17, 2016, translated Nov. 22, 2016, 7 pgs.
Decision to Grant, Japan Application No. 2014-218128, dated Nov. 1, 2016, 6 pgs.

* cited by examiner

FIG. 6B

USER TERMINAL ~602

Window 613:

File (F)  Edit (E)  Format (O)  View (V)  Help (H)

New Document 1

Text up to here is my own, and can be edited freely. However, the part making secondary use of an external document cannot be directly edited. For example, in Document (1), Furuichi et al. state as follows:

In the following, this paper will discuss the usefulness of secondary use of document. In Chapter 2, References Secondary use request list

| Secondary use request ID | Document ID | Secondary use request date/time | Author reply date/time |
|---|---|---|---|
| 33333333 | 1001 | 2014/10/01 13:00 | |
| 22222222 | 1002 | 2014/09/01 13:00 | |
| 11111111 | 1003 | 2014/08/01 13:00 | |

Document ID 1001 (Read-Only)

This paragraph is described in an external document, and cannot be edited freely. However, data processed according to the format of a document making the secondary use may be provided.

| Author reply date/time | Status | Reason |
|---|---|---|
| 2014/08/02 16:00 | Permitted | |
| 2014/10/05 16:00 | Denied | Range of omission is too great |
| 2014/08/02 16:00 | Permitted | |

694

Window 614:

File (F)  Edit (E)  Format (O)  View (V)  Help (H)

New Document 1

Text up to here is my own, and can be edited freely. However, the part making secondary use of an external document cannot be directly edited. For example, in Document (1), Furuichi et al. state as follows:

*This paragraph is described in an external document, and cannot be edited freely. However, data processed according to the format of a document making the secondary use may be provided.*
  Source: *Encouragement of Secondary Use (1)*

In the following, this paper will discuss the usefulness of secondary use of document. In Chapter 2, References Secondary use request list

| Secondary use request ID | Document ID | Secondary use request date/time | Author reply date/time |
|---|---|---|---|
| 33333333 | 1001 | 2014/10/01 13:00 | |
| 22222222 | 1002 | 2014/09/01 13:00 | |
| 11111111 | 1003 | 2014/08/01 13:00 | |

Document ID 1001 (Read-Only)

This paragraph is described in an external document, and cannot be edited freely. However, data processed according to the format of a document making the secondary use may be provided.

| Author reply date/time | Status | Reason |
|---|---|---|
| 2014/08/02 16:00 | Permitted | |
| 2014/10/05 16:00 | Denied | Range of omission is too great |
| 2014/08/02 16:00 | Permitted | |

SUPPORTING SECONDARY USE OF CONTENT OF ELECTRONIC WORK

PRIOR FOREIGN APPLICATION

This application claims priority from Japanese (JP) patent application number 2014-218128, filed Oct. 27, 2014, which is hereby incorporated herein by reference in its entirety.

BACKGROUND

One or more aspects of the present invention relate to a technique for supporting secondary use of content of electronic works.

With the spread of electronic publishing and e-books, cases of publishing official or private electronic works on a network are on the increase.

However, unauthorized use, illegal reproduction, unintended falsification, and the like of electronic works are commonplace.

Accordingly, in many cases, an author unwillingly sacrifices the convenience to protect his/her rights, and publishes an electronic work on a network in a way that prohibits reproduction or editing.

Sacrificing the convenience in the above manner raises a problem that an electronic work becomes hard to use for users (for example, readers and secondary users) of the electronic work.

SUMMARY

Shortcomings of the prior art are overcome and additional advantages are provided through the provision of a computer-implemented method of supporting secondary use of content of an electronic work. The computer-implemented method includes receiving, from a user terminal, a use request requesting secondary use of content of an electronic work, wherein a secondary use policy of one of an author, a copyright holder or a manager of the electronic work is associated with the electronic work; determining whether the use request satisfies the secondary use policy; and transmitting, to the user terminal, together with a unique identifier associated with the use request, content of the electronic work based on the determination.

Computer program products and computer systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4B illustrates an example, according to an aspect of the present invention, of supporting secondary use of content of an electronic work by determining by a server computer, after content, which is a target of secondary use, of an electronic work is edited at a user terminal, whether the edited content satisfies a secondary use policy specified by an author or the like;

FIG. 5A illustrates an example, according to an aspect of the present invention, of supporting secondary use of content of an electronic work by determining by an author or the like of an electronic work, after content, which is a target of secondary use, of the electronic work is edited at a user terminal, whether the edited content satisfies a secondary use policy specified by the author or the like;

FIG. 5B illustrates an example, according to an aspect of the present invention, of supporting secondary use of content of an electronic work by determining by an author or the like of an electronic work, after content, which is a target of secondary use, of the electronic work is edited at a user terminal, whether the edited content satisfies a secondary use policy specified by the author or the like;

FIG. 5C illustrates an example, according to an aspect of the present invention, of supporting secondary use of content of an electronic work by determining by an author or the like of an electronic work, after content, which is a target of secondary use, of the electronic work is edited at a user terminal, whether the edited content satisfies a secondary use policy specified by the author or the like;

FIG. 5D illustrates an example, according to an aspect of the present invention, of supporting secondary use of content of an electronic work by determining by an author or the like of an electronic work, after content, which is a target of secondary use, of the electronic work is edited at a user terminal, whether the edited content satisfies a secondary use policy specified by the author or the like;

FIG. 6B illustrates an example, according to an aspect of the present invention, of supporting secondary use of content of an electronic work by a user terminal displaying next to each other on a screen content of an electronic work and a document being created by a user and centrally managing on the screen the states of a plurality of secondary use requests;

DETAILED DESCRIPTION

Figure 1:
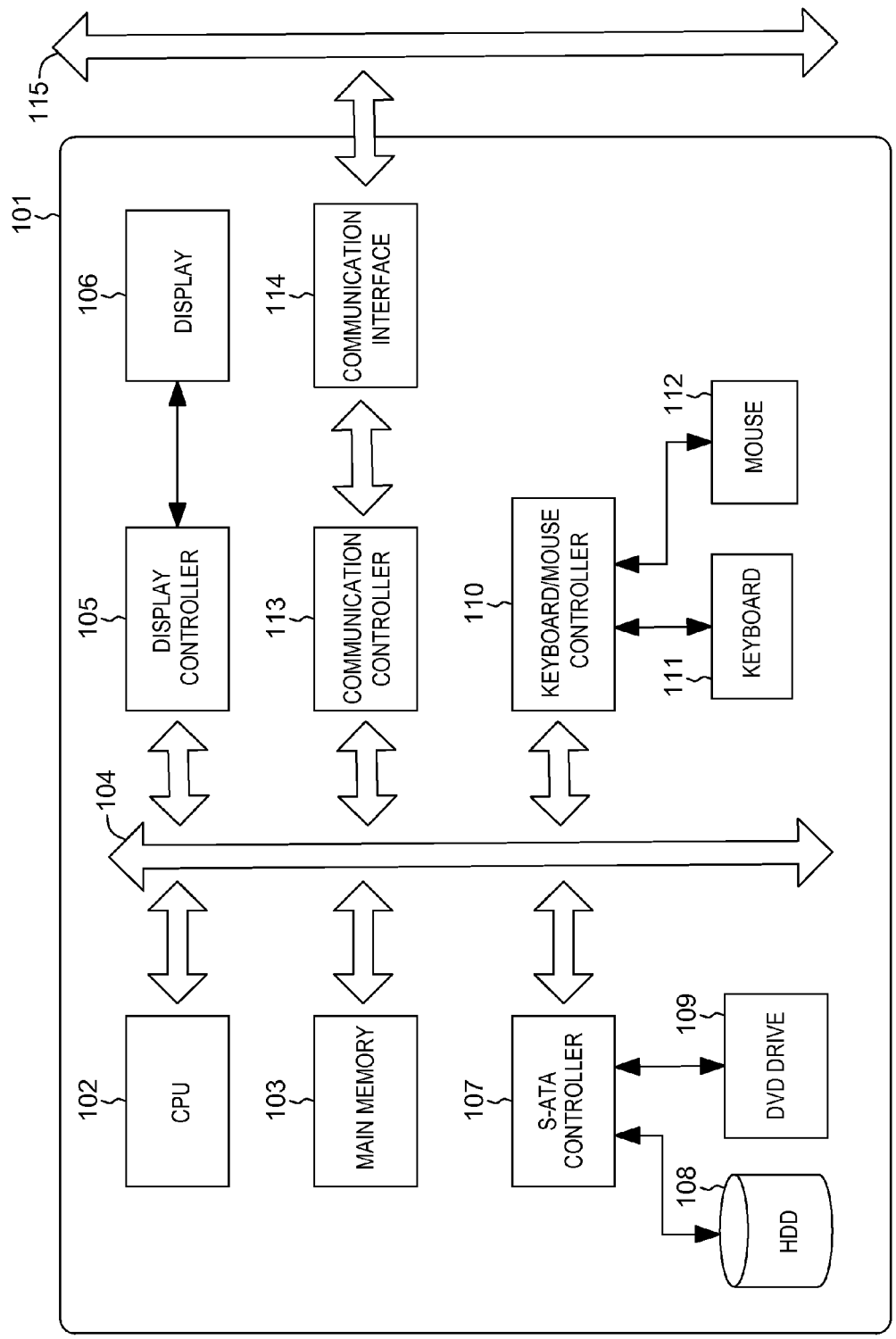
FIG. 1 is a diagram illustrating an example of a server computer that may be used in an aspect of the present invention or a server computer that is in accordance with an aspect of the present invention.

A content distribution system for distributing content from a server to a terminal device over a network has been described. The content distribution system includes content accumulation means for accumulating contents, protection policy accumulation means for accumulating, in association with each content, protection policy information setting conditions for data protection for each content accumulated in the content accumulation means, and protection processing means for reading from the protection policy accumulation means, with respect to content read from the content accumulation means, the protection policy information associated with the content, and for executing a data protection process based on the protection policy information.

Further, a data citation system has been described that includes reading data whose output from storage means is requested from outside over a network; determining whether the data is data created by a data-citing person; determining, in a case where the read data is data created by the data-citing person, whether the data is citation-based data; reading from the storage means, in a case where the data created by the data-citing person is the citation-based data, citation approval data input by a person whose data is cited; determining whether the citation approval data is for agreeing to citation by the data-citing person; reading from the storage means, in a case where the read citation approval data is for agreeing to citation by the data-citing person, a part or all of cited data created by the person whose data is cited; inserting into the citation-based data, or replacing the citation-based data with, a part or all of the cited data created by the person whose data is cited, and outputting data to outside.

A quotation determination supporting device and a quotation determination supporting program are described for supporting determination of whether document data, among pieces of determination target data to be determination targets, is quoted or not.

A digital content editing device, a digital content editing method, a digital content editing program, and a recording medium for reusing digital content according to license information including rights expression for a reuse operation have also been described.

Citation data, particularly literary citations, is dynamically processed for presentation within a document rendering application, such as a word processor.

Additionally, a secondary production creating system that allows a copyright holder to break a production, including various pieces of digital data (contents), such as text data, image data, audio data, and video data, into parts in predetermined units, and allowing use of each part unit for a secondary production has been described.

In the case where an author unwillingly sacrifices the convenience to protect his/her rights, and publishes an electronic work on a network in a way that prohibits reproduction, there are the following problems:

For example, reproduction of a work becomes difficult even when it is desired by the author, such as in the case of legitimate secondary use in a thesis or a newspaper article, or a partial excerpt in an advertisement or the like. Also, in the case where text copy of content of an electronic work on a computer is restricted, for example, typographical errors may occur or the work efficiency may be greatly reduced due to secondary use by hand of the content of the electronic work; or, For example, due to the lack of means for reflecting the intention of an author in a reproduced work, the demand of a secondary user may conflict with the intention of the author regarding the format or the display method of the content of the electronic work.

Accordingly, an aspect of the present invention has its aim to provide a user, at the time of publishing of an electronic work on a network, with an environment where secondary use of the electronic work is enabled with the intention of an author, a copyright holder, or a manager of the electronic work regarding secondary use being reflected.

An embodiment of the present invention will be described below with reference to the drawings. In the following drawings, the same reference sign refers to the same object unless stated otherwise. An embodiment of the present invention described below is for describing aspects of the present invention, and are not intended to limit the scope of aspects of the present invention.

FIG. 1 is a diagram illustrating an example of a server computer that may be used in an aspect of the present invention or a server computer that is in accordance with an aspect of the present invention. This server computer may be configured as a computer device, such as a workstation, a rack-mount server, a blade server, a midrange, a main frame or the like.

A server computer (101) includes one or a plurality of CPUs (102) and a main memory (103), and these are connected to a bus (104). The CPU (102) is based on a 32-bit or 64-bit architecture, for example. The CPU (102) may be of Power™ Series by International Business Machines Corporation, Xeon® Series, Core™ i Series, Core™ 2 Series, Pentium® Series, Celeron® Series or Atom™ Series by Intel Corporation, or Opteron™ Series, A Series, Phenom™ Series, Athlon™ Series, Turion® Series or Sempron™ by Advanced Micro Devices, Inc. (AMD), for example.

A display (106), such as a liquid crystal display (LCD), may be connected to the bus (104) via a display controller (105). Moreover, the liquid crystal display (LCD) may be a touch panel display or a floating touch display, for example. The display (106) may be used to display, using an appropriate graphic interface, an object that is displayed by running of software operating on the server computer (101) (for example, a program for a server computer that is in accordance with an aspect of the present invention or any of various programs for a server computer operating on the server computer (101)). Moreover, the display (106) may output a screen of a web browser application or a word processor, for example.

A disk (108), such as a hard disk or a solid state drive (SSD), may be optionally connected to the bus (104) via an S-ATA or IDE controller (107), for example.

A drive (109), such as a CD, DVD or BD drive, may be optionally connected to the bus (104) via the S-ATA or IDE controller (107), for example.

A keyboard (111) and a mouse (112) may be optionally connected to the bus (104) via a peripheral device controller (110), such as a keyboard/mouse controller or an USB bus.

The disk (108) stores, in a manner loadable into the main memory (103), an operating system, such as an operating system developed for a main frame (for example, z/OS, z/VM, or z/VSE), a program for providing a JAVA® processing environment, such as Windows®, UNIX®, MacOS®, Android®, or J2EE, a Java® application, a Java® virtual machine (VM), or a Java® Just In Time (JIT) compiler, a program for a server computer that is in accordance with an aspect of the present invention, or any of other various programs for a server computer, and data.

The disk (108) may be built in the server computer (101), or may be connected by a cable in a manner allowing access by the server computer (101), or may be connected via a wired or wireless network in a manner allowing access by the server computer (101).

The drive (109) may be used to install from a CD-ROM, a DVD-ROM or a BD, as necessary, on the disk (108), a program, such as an operating system, an application program, or a program for a server computer that is in accordance with an aspect of the present invention.

A communication interface (114) is in accordance with the Ethernet® protocol, for example. The communication interface (114) is connected to the bus (104) via a communication controller (113), and serves the role of connecting the server computer (101) to a communication line (115) in a wired or wireless manner, and provides a network interface layer for a TCP/IP communication protocol for a communication function of the operating system of the server computer (101). Additionally, the communication line may be a wireless LAN environment based on wireless LAN connectivity standards, a Wi-Fi wireless LAN environment, such as IEEE 802.11a/b/g/n, or a cellular network (for example, a 3G or 4G environment, or a satellite cellular network).

Furthermore, the server computer (101) may be made to operate as a physical host machine, or may operate one or a plurality of virtual machines 1 to n (also referred to as domain U or child partition) taking the same or different OSs (for example, Windows®, UNIX®, Linux®) as guest OSs on a hypervisor (also referred to as a virtualization monitor or a virtualization OS) for virtualization software (for example, VMWare®, Hyper-V®, or Xen®).

In FIGS. 2A to 2C, 3A to 3C, 4A and 4B, 5A to 5D, 6A and 6B, 7, and 8A and 8B described below, examples of a process for supporting secondary use of content of an electronic work according to aspects of the present invention are illustrated.

In the description of the examples of the supporting process, a work management server has the configuration of the server computer (101) illustrated in FIG. 1, and may be connected to a storage medium storing an electronic work to be published on a network. This storage medium may be a storage medium provided in the work management server (for example, "108" in FIG. 1), or a storage medium (such as a network attached storage (NAS), a file server, or a proxy server) that can be accessed by a work management server (201) via a cable or via a wired or wireless network.

The electronic work is published on a work management server or a proxy server. Also, a secondary use policy of an author or a copyright holder of the electronic work, or a manager (the author or the like) of the electronic work is associated with the electronic work.

In aspects of the present invention, an author of an electronic work refers to a person who has created the electronic work.

In aspects of the present invention, a copyright holder of an electronic work refers to a person who owns the copyright of the electronic work. A copyright holder may be the author, or since the copyright is transferable, the copyright holder may be a third party (an individual or a corporation) to whom the copyright has been transferred, and not the author.

In aspects of the present invention, a manager of an electronic work is a third party (an individual or a corporation) commissioned or entrusted by the author or the copyright holder to manage the electronic work.

Also, the work management server is connected to a user terminal via a wired or wireless network.

A user terminal may be a computer (a desktop computer or a laptop computer), a tablet terminal, a smartphone, or a mobile phone, but is not restricted to these. Additionally, the user terminal may have the same hardware configuration as the server computer (101) illustrated in FIG. 1, for example.

The user terminal enables browsing of an electronic work managed by the work management server by use of a web browser or browsing software for the electronic work (for example, a dedicated viewer for browsing the electronic work).

Furthermore, the work management server is connected to a terminal of the author or the like via a wired or wireless network. Alternatively, the work management server enables communication with the author or the like via a network or a telephone network, or communication by the use of e-mails, telephone or facsimile, for example.

Figure 2A:
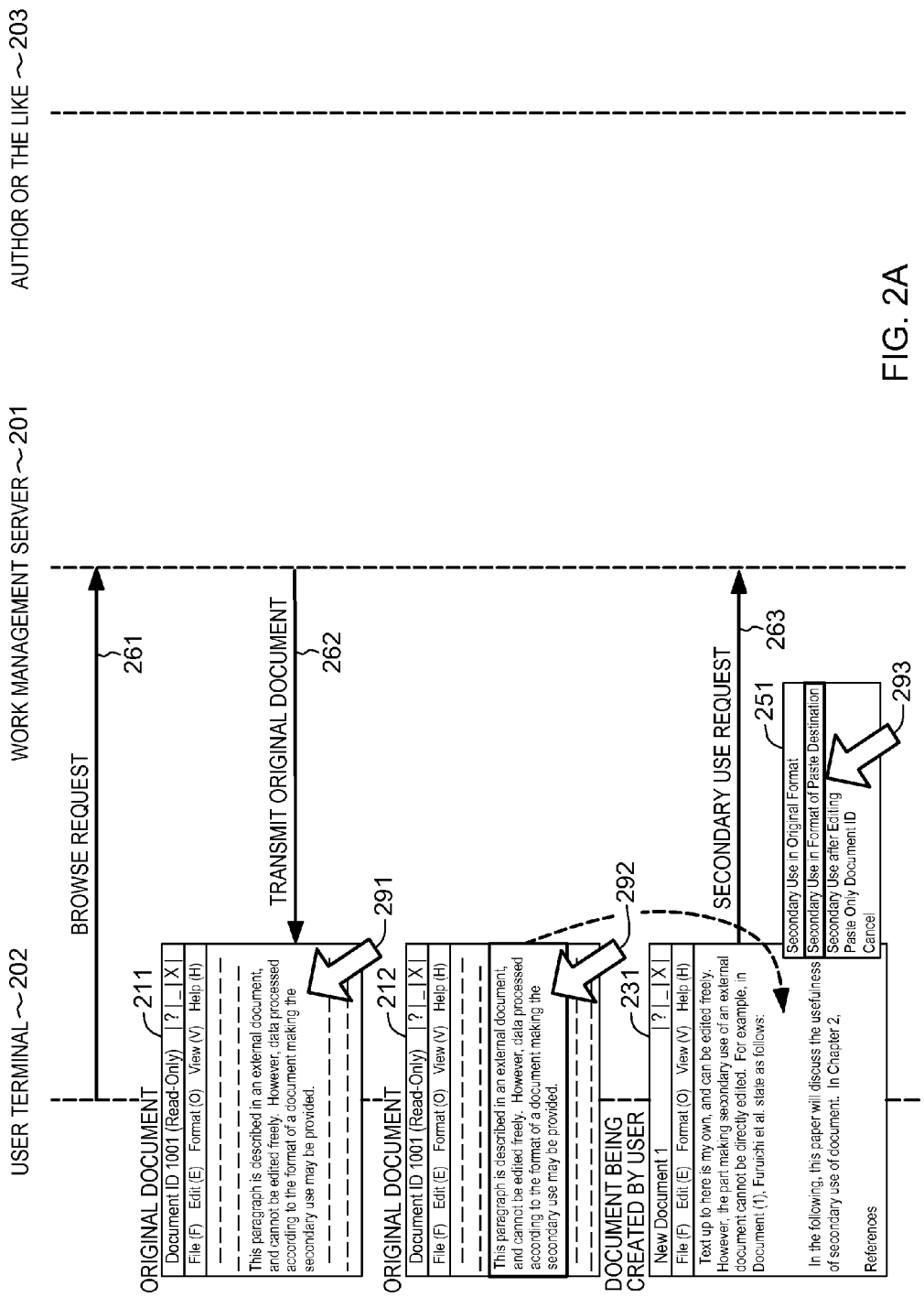
FIG. 2A illustrates an example, according to an aspect of the present invention, of supporting secondary use of content of an electronic work by content, which is a target of secondary use, of an electronic work being transferred from a server computer to a user terminal in a mode not allowing editing.
Figure 2B:
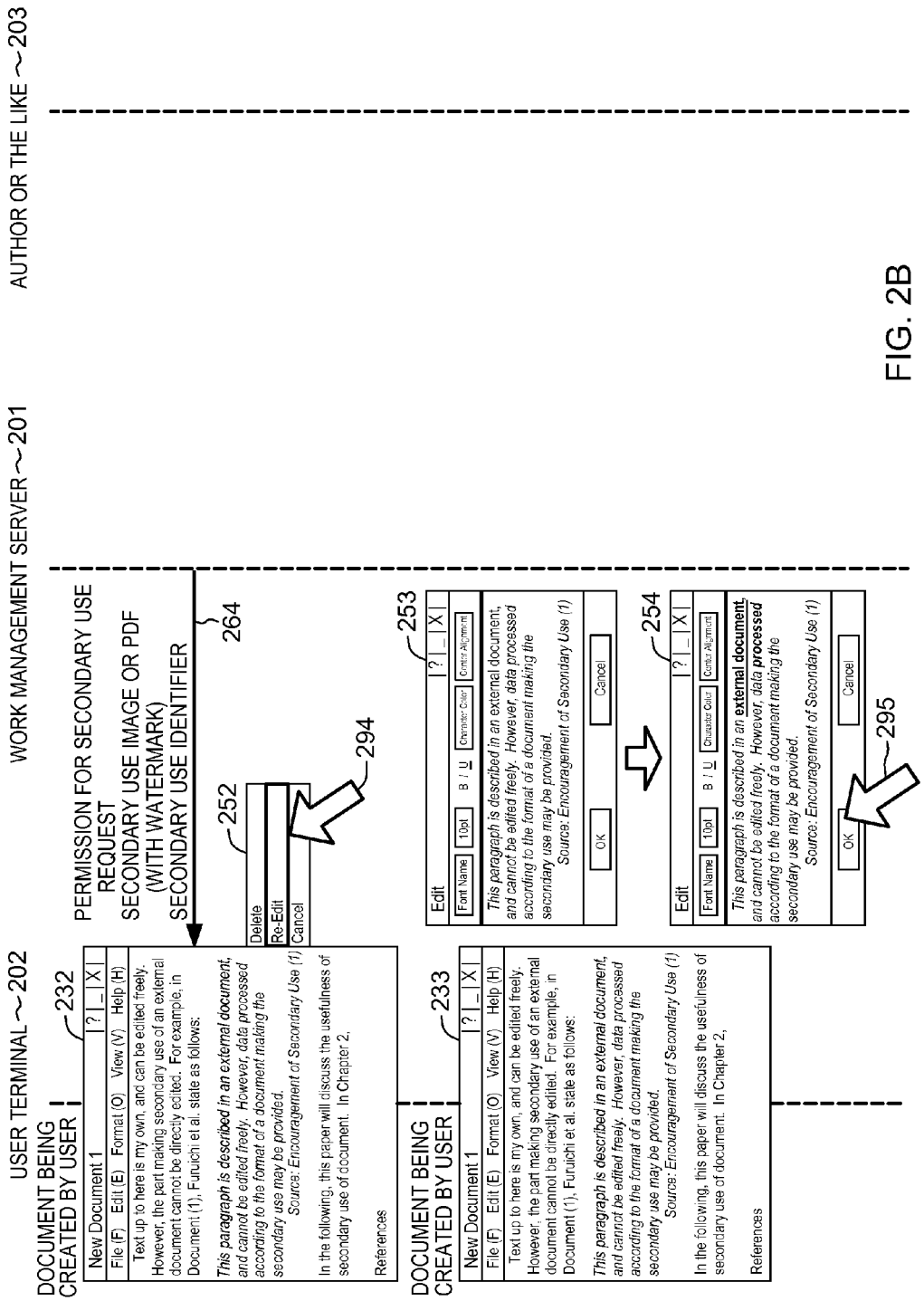
FIG. 2B illustrates an example, according to an aspect of the present invention, of supporting secondary use of content of an electronic work by content, which is a target of secondary use, of an electronic work being transferred from a server computer to a user terminal in a mode not allowing editing.
Figure 2C:
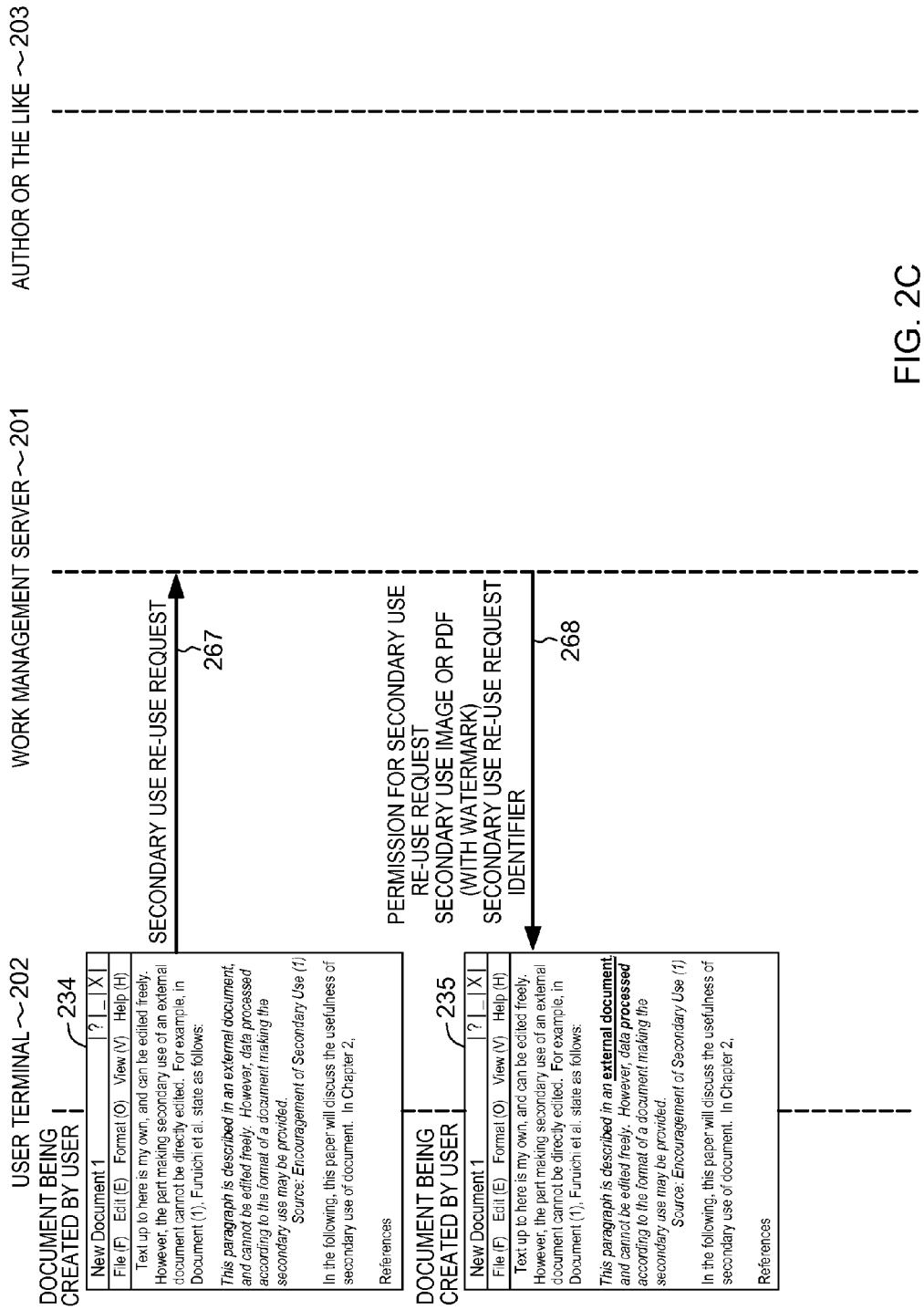
FIG. 2C illustrates an example, according to an aspect of the present invention, of supporting secondary use of content of an electronic work by content, which is a target of secondary use, of an electronic work being transferred from a server computer to a user terminal in a mode not allowing editing.

FIGS. 2A to 2C illustrate an example, according to an aspect of the present invention, of supporting secondary use of content of an electronic work by content, which is a target of secondary use, of an electronic work being transferred from the server computer to the user terminal in a mode not allowing editing.

FIG. 2A illustrates a mode where a user is viewing an electronic work, and is trying to make a secondary use of a part of the content of the electronic work in a document "New Document 1" being created by the user.

The user is accessing a list of electronic works being managed by the work management server (201) via user terminal (202) to search for a sentence to be inserted into the document that the user is creating. For example, the user finds an electronic work on the screen of the user terminal (202) which the user is interested in (i.e. which the user wants to browse), and clicks a browse button or clicks the title (where the URL of the link destination is embedded) of the electronic work to browse the electronic work.

The user terminal (202) transmits a browse request to the work management server (201) according to the clicking by the user (261).

The work management server (201) receives the browse request from the user terminal (202). In response to the reception of the browse request, the work management server (201) transmits data of the original document requested by the browse request to the user terminal (202) (262).

The user terminal (202) receives data of the original document from the work management server (201), and displays the same on a screen (211).

The user is able to browse the content of the electronic work on the screen (211). However, although the electronic work displayed on the screen (211) may be browsed, the user cannot copy the content (for example, sentences or images) of the electronic work to the clipboard, for example, or print the content of the electronic work.

The screen (211) shows a part of the content of the original document. Additionally, in the screen (211), characters indicated by "-" are characters making up the document, but detailed illustration in the screen (211) is omitted.

It is assumed that the user wants to insert (that is, to make a secondary use of) a text "This paragraph is described in an external document, and cannot be edited freely. However, data processed according to the format of a document making the secondary use may be provided." on the screen (211) into a document (231) being created by the user.

The user selects the range of the text, on the screen (211), the secondary use of which is desired, by dragging by a left click using a mouse or by an operating finger, for example (291).

The user terminal (202) displays the selected text in a black/white reversed manner. A screen (212) shows the selected text which is black/white reversed.

To insert the black/white reversed text into the document (231) being created by the user, the user drags and drops, by the mouse, the operating finger or the like, the text at an insertion desired position in the document (231) being created by the user (292).

In response to the detection of drag and drop, the user terminal (202) displays a subwindow (251) on the screen to enable the user to select the mode of secondary use. This subwindow (251) includes, with respect to the text which has been dragged and dropped, an option of "secondary use in original format", an option of "secondary use in format of paste destination", an option of "secondary use after editing", an option of "paste only document ID" of the electronic work, and an option of "cancel" of the process of insertion of the text which has been dragged and dropped into the document (231) being created by the user. The format of a paste destination refers to the format used in the document being created by the user or a dedicated format for the paragraph where the text which has been dragged and dropped is to be inserted or embedded, and may include, for example, font, size, color, background color, maximum height, maximum width, left alignment, center alignment or right alignment of sentences, bold, italics, underlining, indentation, subscript, superscript, strike-through, or a combination of the above.

It is assumed that the user selects "secondary use in format of paste destination" on the subwindow (251) by the mouse or an operating finger, for example (293).

In response to the selection of "secondary use in format of paste destination" in the subwindow (251), the user terminal (202) transmits, to the work management server (201), a secondary use request requesting secondary use of the selected text (that is, content of the electronic work) (263). The secondary use request may include, for example, the document ID and the range of the content for the secondary use (for example, specification by page, paragraph or line for secondary use is possible), and may optionally include the format of the content for the secondary use (for example, font, size, color, background color, maximum height, maximum width, left alignment, center alignment or right alignment of sentences, bold, italics, underlining, indentation, subscript, superscript, strike-through, or a combination of the above).

Furthermore, in one mode, the user terminal (202) may transmit to the work management server (201), together with the secondary use request, a unique secondary use request identifier that is associated with the secondary use request (263). This secondary use request identifier is an identifier for identifying the secondary use request, and may include an ID of the user (for example, a user ID), an ID of the electronic work (for example, an ISBN), and the transmission date/time of the secondary use request, for example.

In response to the reception of the secondary use request (and the secondary use request identifier), the work management server (201) determines whether the secondary use request satisfies the secondary use policy of the electronic work. This secondary use policy may include availability of secondary use of the content, the data type (for example, text, mode not allowing editing (for example, an image or a PDF which is set to not allow editing), or OLE (Object Linking and Embedding)), the range allowing secondary use, the format, availability of tertiary or higher use, or a combination of the above, for example. The secondary use policy may be decided by the author, the copyright holder or the manager of the electronic work.

FIG. 2B illustrates an aspect where the work management server (201) is giving permission to the secondary use request from the user terminal (202), and where the user is trying to re-edit the content (for example, an image or a PDF which is set to not allow editing) which has been inserted into the document "New Document 1" being created by the user.

In response to the secondary use request satisfying the secondary use policy of the electronic work, the work management server (201) transmits, to the user terminal (202), a permission notification for the secondary use request, the content which is the target of secondary use (in a mode not allowing editing of the text), and the secondary use request identifier (264). Moreover, the work management server (201) may edit the content which is the target of secondary use so that the format of the content which is the target of secondary use is in accordance with the format of the paste destination (that is, the document being created by the user). For example, the work management server (201) may execute editing to make the format of the content which is the target of secondary use the same as the format of the paste destination, and moreover, execute conversion into an image or a PDF which is set to not allow editing so as to disable editing of the edited content. Then, the work management server (201) transmits, to the user terminal (202), the permission notification for the secondary use request, the edited content which is the target of secondary use (in a mode not allowing editing of the text), and the secondary use request identifier (264).

A mode not allowing editing may be an image or a PDF which is set to not allow editing (that is, a PDF editing of whose text is restricted), for example. A secondary use image may include a watermark indicating secondary use (for example, information such as the secondary use request identifier, the user ID, the document ID or the like is embedded), for example. The secondary use request identifier may be the same secondary use request identifier as the one transmitted from the user terminal (202), or one obtained by changing the secondary use request identifier (for example, one obtained by adding the result of the permission notification (Yes (for example, a numerical value "1") or No (a numerical value "0")), or a unique identifier newly generated at the work management server (201).

In response to the reception of the permission notification for the secondary use request, the content which is the target of secondary use or the edited content (hereinafter these two contents will be referred to also as "(edited) content"), and the secondary use request identifier, the user terminal (202) displays the (edited) content by inserting the same into the document (231) being created by the user or by embedding the same in the document (231) being created by the user (232). Additionally, since the (edited) content is inserted into a dedicated paragraph for insertion or embedding of content for secondary use, and the format set for the dedicated paragraph is italics, the (edited) content is displayed in italics. Furthermore, the user terminal (202) may embed the secondary use request identifier in the content inserted in a mode not allowing editing, or may display the secondary use request identifier on the screen near the inserted content. Moreover, the user terminal (202) may embed, in the (edited) content inserted in a mode not allowing editing, the source of the (edited) content (or the title of the electronic work) inserted in a mode not allowing editing, or may display the source, on the screen, near the inserted (edited) content or in a section for reference documents.

It is assumed that the user wants to re-edit the (edited) content. However, the user is not allowed to directly re-edit the (edited) content. Accordingly, the user calls a subwindow (252) for re-editing by clicking the right button of the mouse cursor or by double-clicking by the operating finger at the position in the document (232) being created by the user where the (edited) content is inserted. This subwindow (252) includes an option "delete" for deleting the (edited) content, an option "re-edit" for re-editing the (edited) content, and an option "cancel" for the re-editing process.

It is assumed that the user selects "re-edit" in the subwindow (252) by the mouse or the operating finger, for example (294).

In response to the selection of "re-edit" in the subwindow (252), the user terminal (202) displays a subwindow (253) for re-editing, and displays the (edited) content in the subwindow (253) for re-editing.

It is assumed that the user changes the format, in the subwindow (253), by changing the font of the sentence "external document" to bold and underlining the same, by cancelling the italics for the sentence "cannot be edited freely" and changing the character color to red, and by changing the font of the sentence "processed" to bold and making the character size bigger.

The user terminal (202) re-displays the (edited) content to that shown in a subwindow (254) according to the change in the format.

In response to completion of the change (re-editing) in the format, the user presses an "OK" button in the subwindow (254) by the mouse or the operating finger, for example (295).

FIG. 2C illustrates an aspect where the work management server (201) is giving permission to a secondary use re-use request from the user terminal (202), and where the document "New Document 1" being created by the user is re-edited.

In response to the pressing of the "OK" button (295), the user terminal (202) transmits the specifics of the editing as the secondary use re-use request to the work management server (201) to check whether re-editing is permitted (267).

Also, in one aspect, the user terminal (202) may transmit to the work management server (201), together with the secondary use re-use request, a unique secondary use re-use request identifier (or a re-edit request identifier) that is associated with the secondary use re-use request (267). This secondary use re-use request identifier is an identifier for identifying the secondary use re-use request, and may include an ID of the user (for example, a user ID), an ID of the electronic work (for example, an ISBN), and the transmission date/time of the secondary use re-use request, for example. Furthermore, the secondary use re-use request may be different from the secondary use request (263) (especially, the transmission date/time is different).

In response to the reception of the secondary use re-use request (and the secondary use re-use request identifier), the work management server (201) determines whether the secondary use re-use request satisfies the secondary use policy of the electronic work. This secondary use policy is as described above.

In response to the secondary use re-use request satisfying the secondary use policy of the electronic work, the work management server (201) transmits, to the user terminal (202), a permission notification for the secondary use re-use request, the re-edited content which is the target of secondary use (in a mode not allowing editing of the text), and the secondary use re-use request identifier (268). Moreover, the work management server (201) may re-edit the re-edited content which is the target of secondary use so that the format of the re-edited content which is the target of secondary use is in accordance with the format of the paste destination (that is, the document being created by the user). For example, the work management server (201) may convert the re-edited content which is the target of secondary use into an image or a PDF which is set to not allow editing so as to disable editing of the re-edited content. Then, the work management server (201) transmits, to the user terminal (202), the permission notification for the secondary use re-use request, the re-edited content which is the target of secondary use (in a mode not allowing editing of the text), and the secondary use re-use request identifier (268).

In response to the reception of the permission notification for the secondary use re-use request, the re-edited content which is the target of secondary use, and the secondary use re-use request identifier, the user terminal (202) replaces the (edited) content (for example, an image or a PDF which is set to not allow editing) that is already inserted in the document (232) being created by the user with the re-edited content (for example, an image or a PDF which is set to not allow editing). Furthermore, the user terminal (202) may embed the secondary use re-use request identifier in the re-edited content inserted in a mode not allowing editing, or may display the secondary use re-use request identifier on the screen near the inserted content.

Figure 3A:
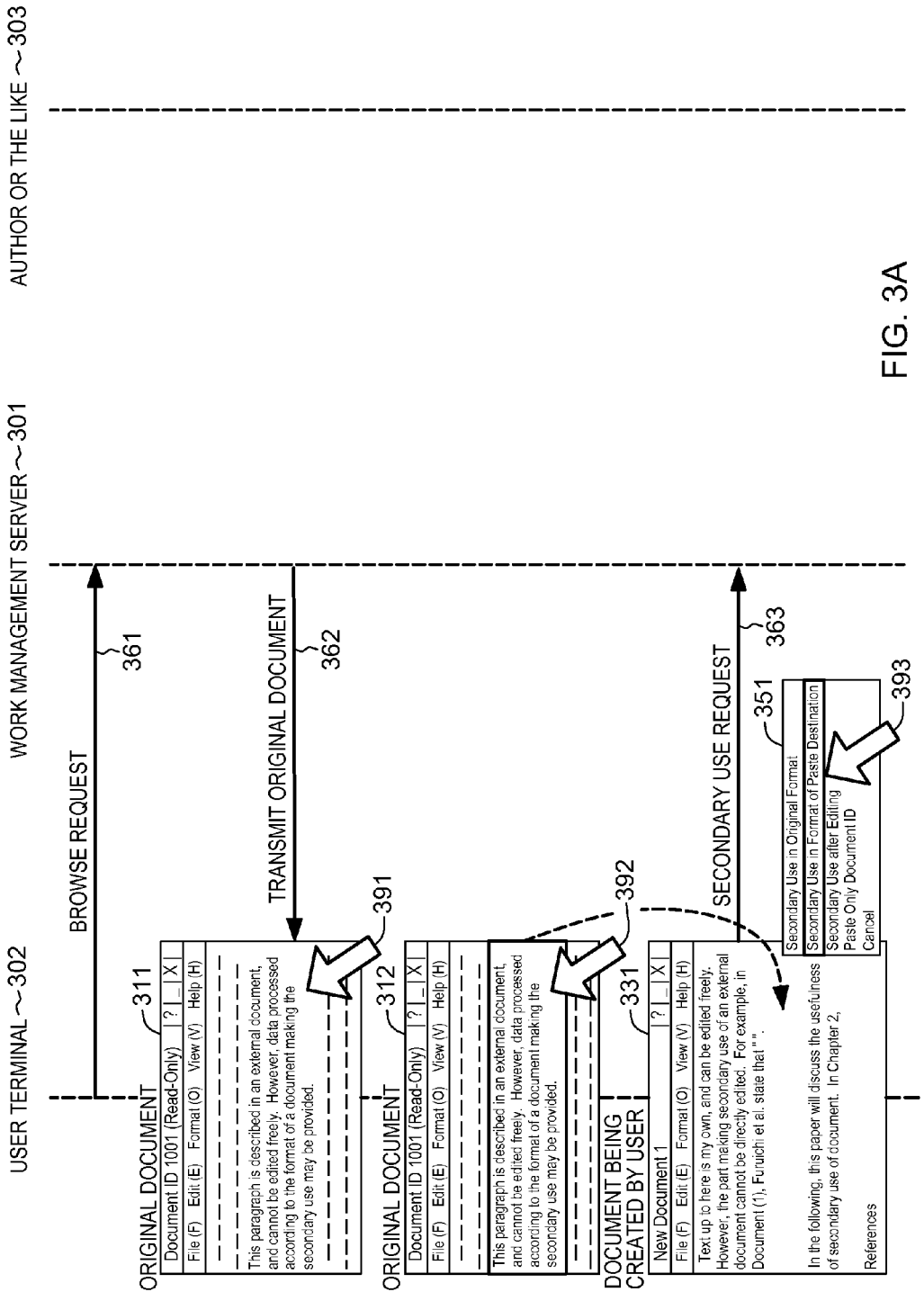
FIG. 3A illustrates an example, according to an aspect of the present invention, of supporting secondary use of content of an electronic work by content, which is a target of secondary use, of an electronic work being transferred from a server computer to a user terminal in the mode of an object.
Figure 3B:
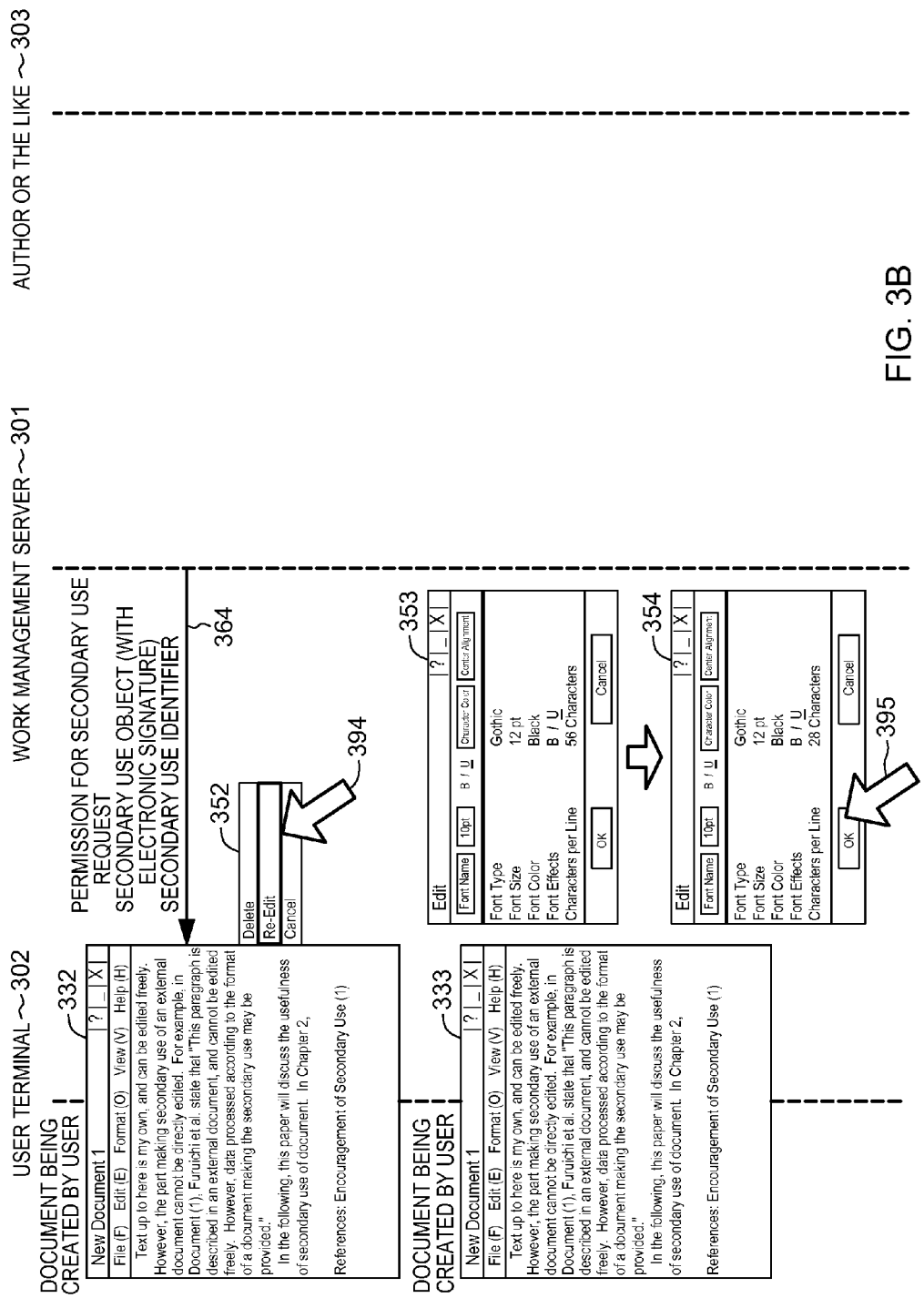
FIG. 3B illustrates an example, according to an aspect of the present invention, of supporting secondary use of content of an electronic work by content, which is a target of secondary use, of an electronic work being transferred from a server computer to a user terminal in the mode of an object.
Figure 3C:
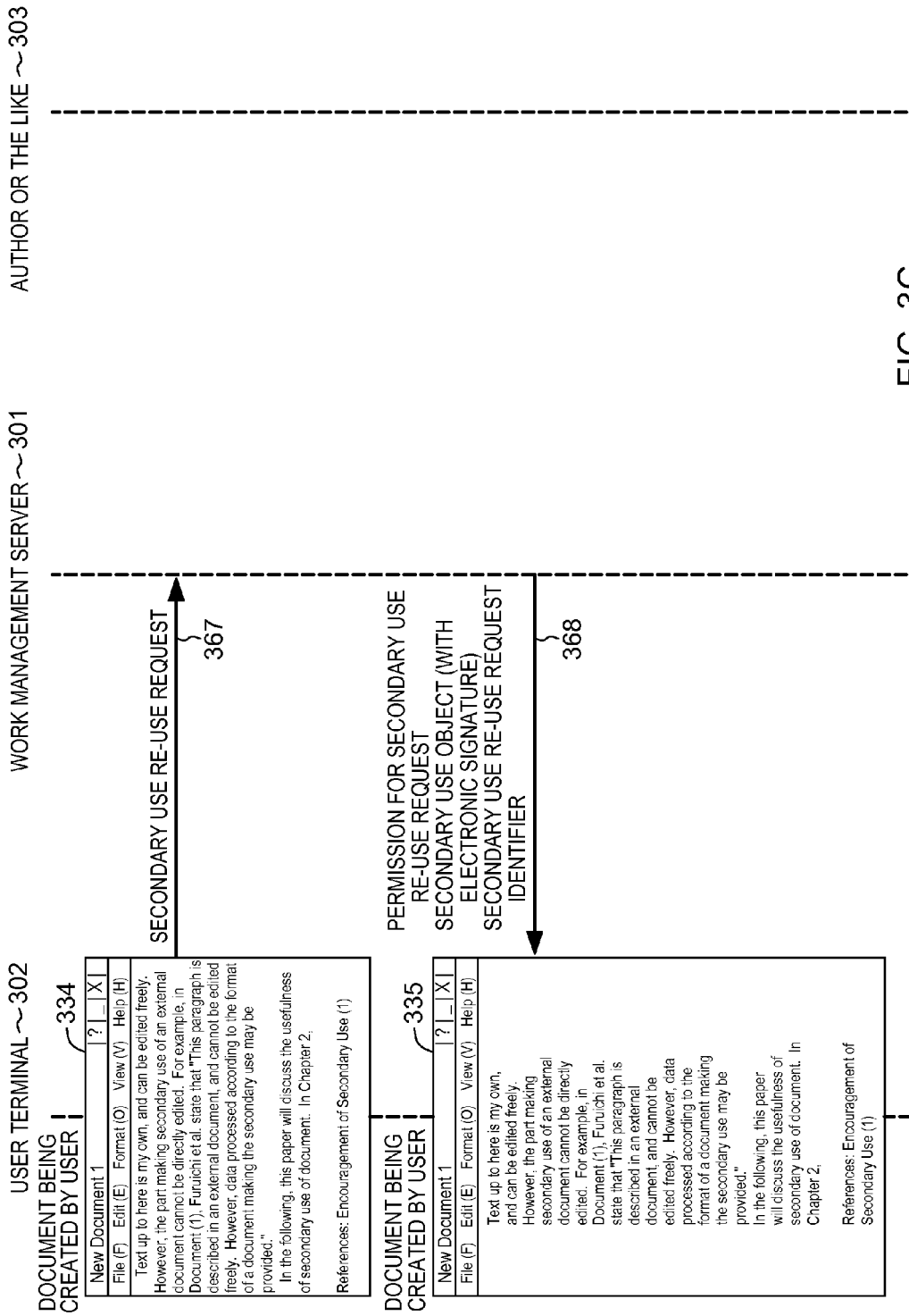
FIG. 3C illustrates an example, according to an aspect of the present invention, of supporting secondary use of content of an electronic work by content, which is a target of secondary use, of an electronic work being transferred from a server computer to a user terminal in the mode of an object.

FIGS. 3A to 3C illustrate an example, according to an aspect of the present invention, of supporting secondary use of content of an electronic work by content, which is a target of secondary use, of an electronic work being transferred from the server computer to the user terminal in a mode of an object.

FIG. 3A illustrates an aspect where a user is viewing an electronic work, and is trying to make a secondary use of a part of the content of the electronic work in a document "New Document 1" being created by the user.

Each of the processes (361 to 363) illustrated in FIG. 3A is the same as each of the processes (261 to 263) illustrated in FIG. 2A. Accordingly, description of each of the processes (261 to 263) illustrated in FIG. 2A should be referred to with respect to each of the processes (361 to 363) illustrated in FIG. 3A.

FIG. 3B illustrates an aspect where a work management server (301) is giving permission to a secondary use request from a user terminal (302), and where content for secondary use is inserted in a document (331) being created by the user, and a mode where the user is trying to re-edit the content (for example, an image or a PDF which is set to not allow editing) inserted in the document "New Document 1" being created by the user.

In response to the secondary use request satisfying the secondary use policy of the electronic work, the work management server (301) transmits, to the user terminal (302), a permission notification for the secondary use request, the content which is the target of secondary use (for example, OLE), and the secondary use request identifier (364). Moreover, the work management server (301) may edit the content which is the target of secondary use so that the format of the content which is the target of secondary use is in accordance with the format of the paste destination (that is, the document being created by the user). For example, the work management server (301) may execute editing of making the format of the content which is the target of secondary use the same as the format of the paste destination (that is, the document being created by the user). Then, the work management server (301) transmits, to the user terminal (302), the permission notification for the secondary use request, the edited content which is the target of secondary use, and the secondary use request identifier (364).

The secondary use request identifier may be the same secondary use request identifier as the one transmitted from the user terminal (302), or one obtained by changing the secondary use request identifier (for example, one obtained by adding the result of the permission notification (Yes (for example, a numerical value "1") or No (a numerical value "0")), or a unique identifier newly generated at the work management server (301).

In response to the reception of the permission notification for the secondary use request, the edited content which is the target of secondary use, and the secondary use request identifier, the user terminal (302) inserts the edited content into the document (331) being created by the user as an OLE object, and displays the document (332). Furthermore, the user terminal (302) may embed the secondary use request identifier in the content inserted as an OLE object, or may display the secondary use request identifier on the screen near the inserted content. Moreover, the user terminal (302) may embed, in the edited content inserted as an OLE object, the source of the edited content (or the title of the electronic work) inserted as an OLE object, or may display the source, on the screen, near the edited content inserted as an OLE object or in a section for reference documents.

It is assumed that the user wants to re-edit the edited content. However, the user is not allowed to directly re-edit the edited content. Accordingly, the user calls a subwindow (352) for re-editing by clicking the right button of the mouse cursor or by double-clicking by the operating finger at the position in the document (332) being created by the user where the edited content is inserted. This subwindow (352) includes an option "delete" for deleting the edited content, an option "re-edit" for re-editing the edited content, and an option "cancel" for the re-editing process.

It is assumed that the user selects "re-edit" in the subwindow (352) by the mouse or the operating finger, for example (394).

In response to the selection of "re-edit" in the subwindow (352), the user terminal (302) displays a subwindow (353) for re-editing, and displays options for changing the format of the edited content in the subwindow (353) for re-editing.

It is assumed that the user changes, in the subwindow (353), the format regarding the number of characters per line from 56 characters to 28 characters. A subwindow (354) shows the state after setting of the format change.

In response to completion of the change (re-editing) in the format, the user presses an "OK" button in the subwindow (354) by the mouse or the operating finger, for example (395).

FIG. 3C illustrates an aspect where the work management server (301) is giving permission to the secondary use re-use request from the user terminal (302), and where the document "New Document 1" being created by the user is re-edited.

In response to the pressing of the "OK" button (395), the user terminal (302) transmits the specifics of the editing as the secondary use re-use request to the work management server (301) to check whether re-editing is permitted (367).

Also, in one aspect, the user terminal (302) may transmit to the work management server (301), together with the secondary use re-use request, a unique secondary use re-use request identifier that is associated with the secondary use re-use request (367). This secondary use re-use request identifier is an identifier for identifying the secondary use re-use request, and may include an ID of the user (for example, a user ID), an ID of the electronic work (for example, an ISBN), and the transmission date/time of the secondary use re-use request, for example. Furthermore, the secondary use re-use request may be different from the secondary use request (363) (especially, the transmission date/time is different).

In response to the reception of the secondary use re-use request (and the secondary use re-use request identifier), the work management server (301) determines whether the secondary use re-use request satisfies the secondary use policy of the electronic work. This secondary use policy is as described above.

In response to the secondary use re-use request satisfying the secondary use policy of the electronic work, the work management server (301) transmits, to the user terminal (302), a permission notification for the secondary use re-use request, the re-edited content which is the target of secondary use (for example, the OLE object of the text), and the secondary use re-use request identifier (368).

In response to the reception of the permission notification for the secondary use re-use request, the re-edited content which is the target of secondary use, and the secondary use re-use request identifier, the user terminal (302) replaces the edited content (which is an OLE object) that is already inserted in the document (332) being created by the user with the re-edited content (which is an OLE object). Furthermore, the user terminal (302) may embed the secondary use re-use request identifier in the re-edited content inserted as an OLE object, or may display the secondary use re-use request identifier on the screen near the inserted content.

Figure 4A:
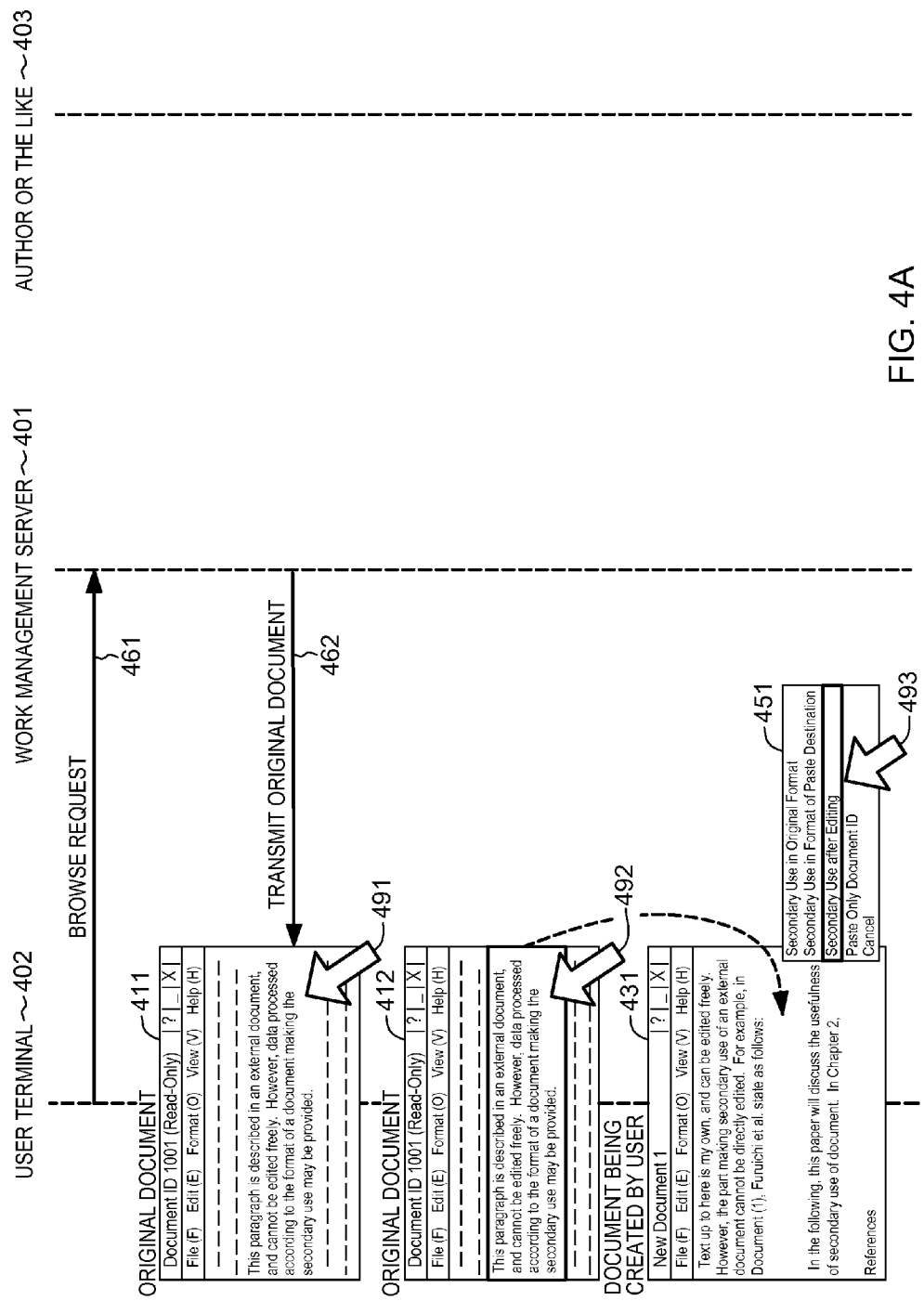
FIG. 4A illustrates an example, according to an aspect of the present invention, of supporting secondary use of content of an electronic work by determining by a server computer, after content, which is a target of secondary use, of an electronic work is edited at a user terminal, whether the edited content satisfies a secondary use policy specified by an author, a copyright holder or a manager.
Figure 4B:
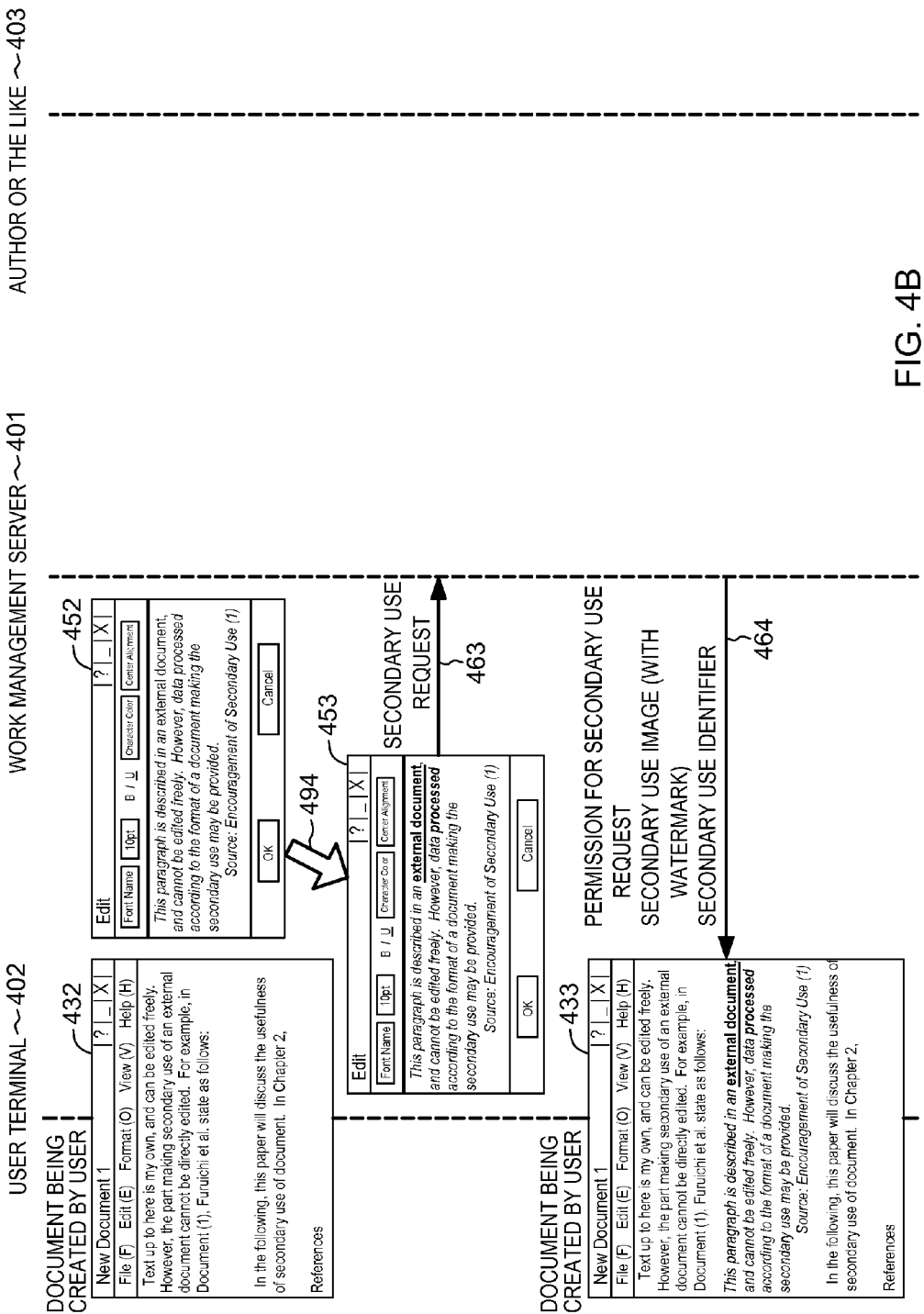

FIGS. 4A and 4B illustrate an example, according to an aspect of the present invention, of supporting secondary use of content of an electronic work by determining by a server computer, after content, which is a target of secondary use, of an electronic work is edited at a user terminal, whether the edited content satisfies a secondary use policy specified by an author.

FIG. 4A illustrates an aspect where a user is viewing an electronic work, and is trying to make a secondary use of a part of the content of the electronic work in a document "New Document 1" being created by the user after editing the part.

Each of the processes (461 and 462) illustrated in FIG. 4A is the same as each of the processes (261 and 262) illustrated in FIG. 2A. Accordingly, description of each of the processes (261 and 262) illustrated in FIG. 2A should be referred to with respect to each of the processes (461 and 462) illustrated in FIG. 4A.

In response to the detection of drag and drop at an insertion desired position in a document (431) being created by a user by the mouse or the operating finger, for example, a user terminal (402) displays, on the screen, a subwindow (451) for allowing the user to select the mode of secondary use. This subwindow (451) includes, with respect to the text which has been dragged and dropped, an option of "secondary use in original format", an option of "secondary use in format of paste destination", an option of "secondary use after editing", an option of "paste only document ID" of the electronic work, and an option of "cancel" of the process of insertion of the text which has been dragged and dropped into the document (431) being created by the user.

It is assumed that the user selects "secondary use after editing" in the subwindow (451) by the mouse or the operating finger, for example (493).

FIG. 4B illustrates a mode where a work management server (401) is giving permission to a secondary use request from the user terminal (402), and where content for secondary use (for example, an image or a PDF which is set to not allow editing) is inserted in a document (431) being created by the user.

In response to selection of "secondary use after editing" in the subwindow (451), the user terminal (402) displays a subwindow (452) for editing the selected text (that is, content of an electronic work), and displays the selected content in the subwindow (452) for editing.

It is assumed that the user wants to change the format, in the subwindow (452), by changing the font of the sentence "external document" to bold and underlining the same, by cancelling the italics for the sentence "cannot be edited freely" and changing the character color to red, and by changing the font of the sentence "processed" to bold and making the character size bigger (494). The user makes these changes in the format in the subwindow (452) (453), and presses the "OK" button. Additionally, the format may include, for example, font, size, color, background color, maximum height, maximum width, left alignment, center alignment or right alignment of sentences, bold, italics, underlining, indentation, subscript, superscript, strikethrough, or a combination of the above.

According to the change in the format, the user terminal (402) transmits, to the work management server (401), a secondary use request requesting secondary use of the text (that is, content of the electronic work) whose format has been changed, to obtain permission regarding the change in the format (463). The secondary use request may include, for example, the document ID and the range of the content for the secondary use (for example, specification by page, paragraph or line for secondary use is possible), and the change in the format.

Furthermore, in one aspect, the user terminal (402) may transmit to the work management server (401), together with the secondary use request, a unique secondary use request identifier that is associated with the secondary use request (463). This secondary use request identifier is an identifier for identifying the secondary use request, and may include an ID of the user (for example, a user ID), an ID of the electronic work (for example, an ISBN), and the transmission date/time of the secondary use request, for example.

In response to the reception of the secondary use request (and the secondary use request identifier), the work management server (401) determines whether the secondary use request satisfies the secondary use policy of the electronic work. The secondary use policy may include availability of secondary use of the content, the data type, the range allowing secondary use, the format, availability of tertiary or higher use, or a combination of the above, for example. The secondary use policy may be decided by the author, the copyright holder or the manager of the electronic work.

In response to the secondary use request satisfying the secondary use policy of the electronic work, the work management server (401) transmits, to the user terminal (402), a permission notification for the secondary use request, the content which is the target of secondary use (in a mode not allowing editing of the text), and the secondary use request identifier (464). Moreover, the work management server (401) may edit the content which is the target of secondary use so that the format of the content which is the target of secondary use is in accordance with the format of the paste destination (that is, the document being created by the user). For example, the work management server (401) may execute editing of making the format of the content which is the target of secondary use the same as the format of the paste destination, and moreover, execute conversion into an image or a PDF which is set to not allow editing so as to disable editing of the edited content. Then, the work management server (401) transmits, to the user terminal (402), the permission notification for the secondary use request, the edited content which is the target of secondary use (in a mode not allowing editing of the text), and the secondary use request identifier (464).

In response to the reception of the permission notification for the secondary use request, the edited content which is the target of secondary use, and the secondary use request identifier, the user terminal (402) displays the edited content by inserting the same into the document (431) being created by the user or by embedding the same in the document (431) being created by the user (433). Furthermore, the user terminal (402) may embed the secondary use request identifier in the content inserted in a mode not allowing editing, or may display the secondary use request identifier on the screen near the inserted content. Moreover, the user terminal (402) may embed, in the edited content inserted in a mode not allowing editing, the source of the edited content (or the title of the electronic work) inserted in a mode not allowing editing, or may display the source, on the screen, near the inserted edited content or in a section for reference documents.

FIGS. 5A to 5D illustrate an example, according to an aspect of the present invention, of supporting secondary use of content of an electronic work by determining by an author of an electronic work, after content, which is a target of secondary use, of the electronic work is edited at a user terminal, whether the edited content satisfies a secondary use policy specified by the author.

Figure 5A:
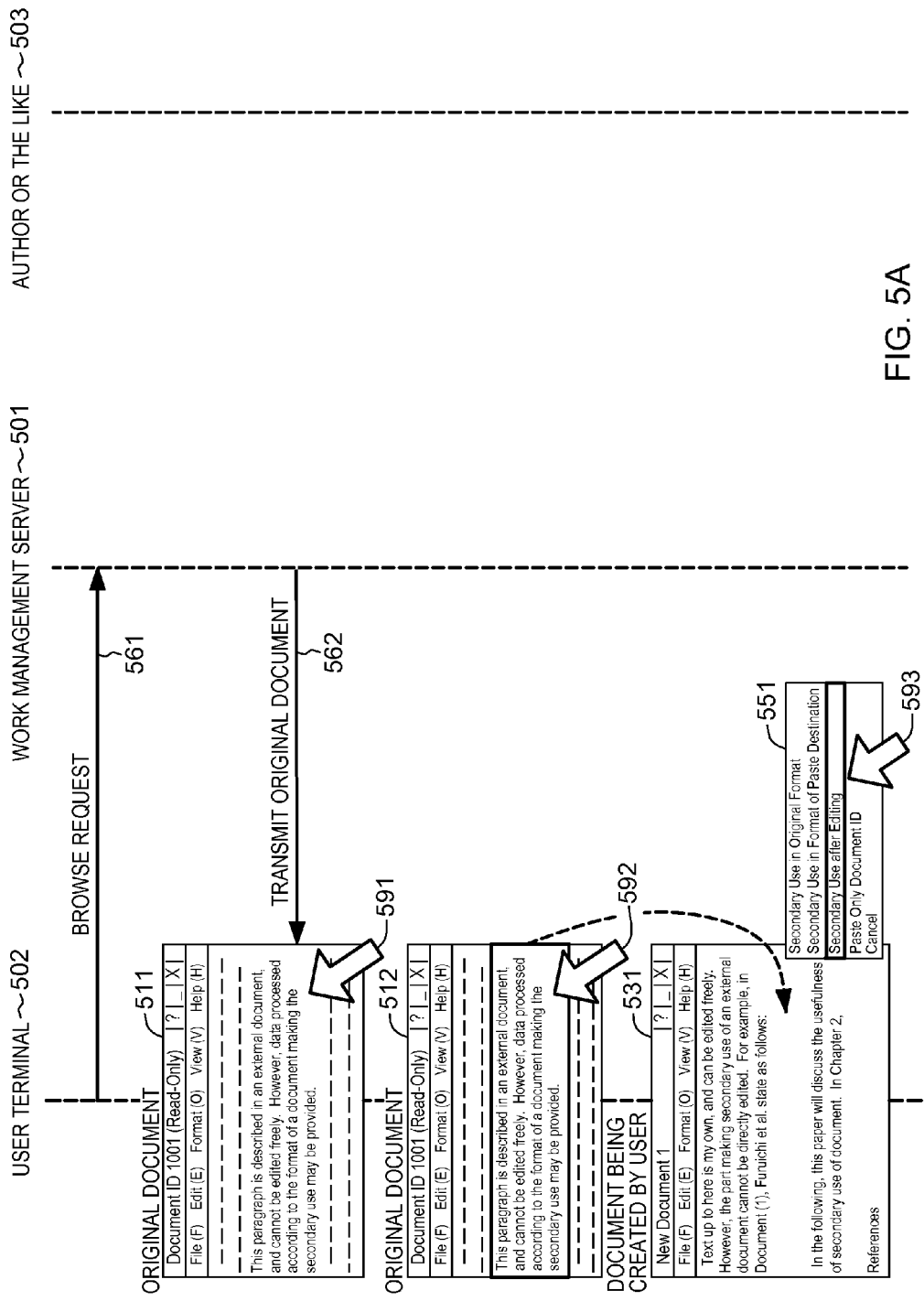

FIG. 5A illustrates an aspect where a user is viewing an electronic work, and is trying to make a secondary use of a part of the content of the electronic work in a document "New Document 1" being created by the user after editing the part.

Each of the processes (561 and 562) illustrated in FIG. 5A is the same as each of the processes (261 and 262) illustrated in FIG. 2A. Accordingly, description of each of the processes (261 and 262) illustrated in FIG. 2A should be referred to with respect to each of the processes (561 and 562) illustrated in FIG. 5A.

Moreover, each of the processes (591 to 593) illustrated in FIG. 5A is the same as each of the processes (491 to 493) illustrated in FIG. 4A. Accordingly, description of each of the processes (491 to 493) illustrated in FIG. 4A should be referred to with respect to each of the processes (591 to 593) illustrated in FIG. 5A.

Figure 5B:
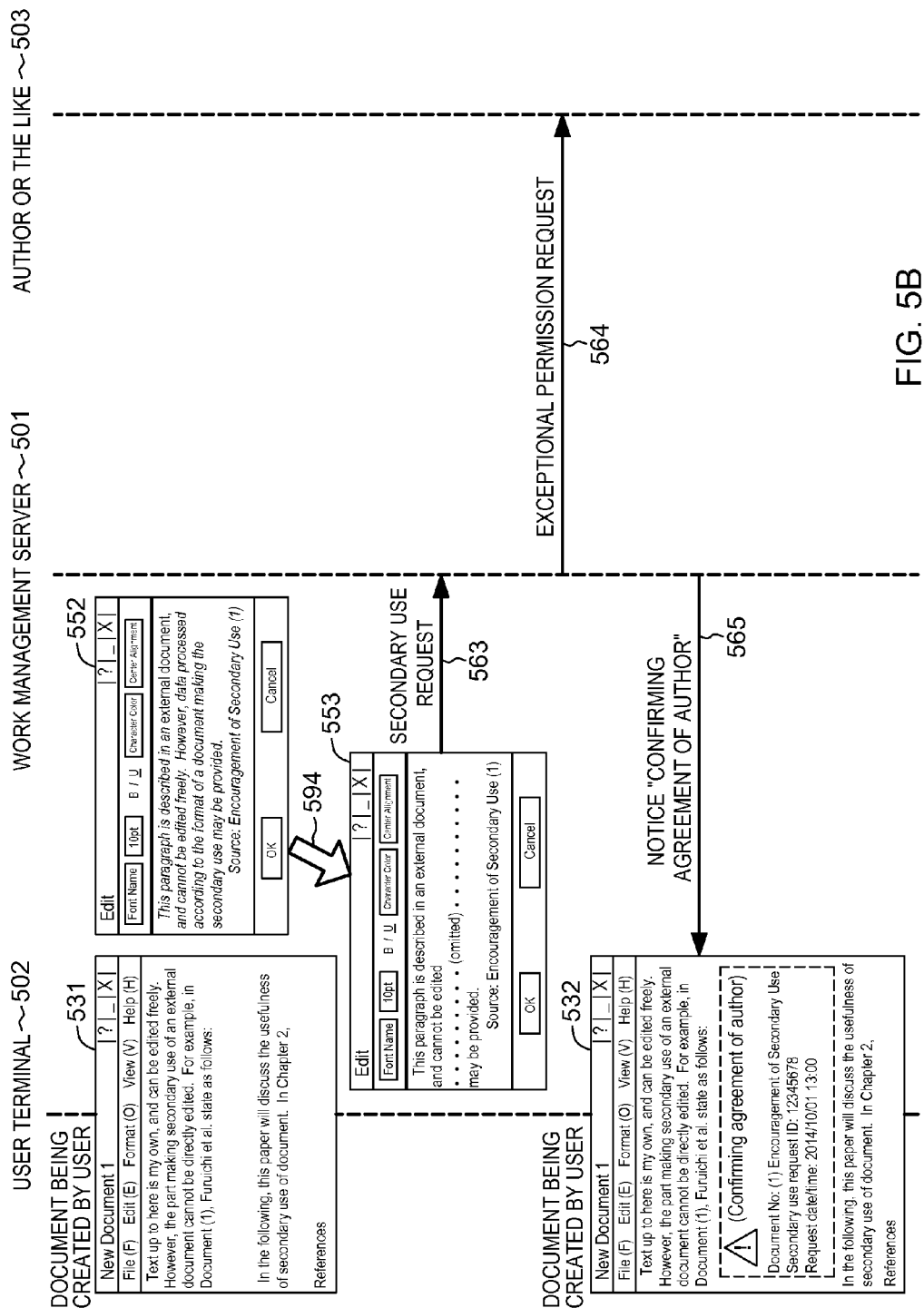

FIG. 5B illustrates a mode where, after content, which is a target of secondary use, of an electronic work is edited by a user at a user terminal, a work management server (501) requests an author or the like for an exceptional permission for a secondary use request from the user terminal (502).

In response to selection of "secondary use after editing" in a subwindow (551), the user terminal (502) displays a subwindow (552) for editing a selected text (that is, content of an electronic work), and displays the selected content in the subwindow (552) for editing.

It is assumed that the user wants to change the content, in the subwindow (552), by omitting, and replacing with "(omitted)", a part of the sentences of the text for secondary use (594). It is assumed that the user makes the change in the content in the subwindow (552) (553), and presses the "OK" button.

According to the change in the content, the user terminal (502) transmits, to the work management server (501), a secondary use request requesting secondary use of the text (that is, content of the electronic work) whose content has been changed, to obtain permission regarding the change in the content (563). The secondary use request may include, for example, the document ID and the range of the content for the secondary use (for example, specification by page, paragraph or line for secondary use is possible), and the change in the content.

Furthermore, in one aspect, the user terminal (502) may transmit to the work management server (501), together with the secondary use request, a unique secondary use request identifier that is associated with the secondary use request (563). This secondary use request identifier is an identifier for identifying the secondary use request, and may include an ID of the user (for example, a user ID), an ID of the electronic work (for example, an ISBN), and the transmission date/time of the secondary use request, for example.

In response to the reception of the secondary use request (and the secondary use request identifier), the work management server (501) determines whether the secondary use request satisfies the secondary use policy of the electronic work. The secondary use policy may include availability of secondary use of the content, the data type, the range allowing secondary use, the format, availability of tertiary or higher use, or a combination of the above, for example. The secondary use policy may be decided by the author, the copyright holder or the manager of the electronic work.

In response to the secondary use request not satisfying the secondary use policy of the electronic work, the work management server (501) determines whether to transmit an exceptional permission request inquiring whether the secondary use request may be granted as an exception to an author or a copyright holder of the electronic work or a manager (author or the like) of the electronic work (503).

In the case of transmitting the exceptional permission request to the author or the like (503), the work management server (501) transmits the exceptional permission request to the author or the like (503) (564). On the other hand, in the case of not transmitting the exceptional permission request to the author or the like (503), the work management server (501) transmits, to the user terminal (502), a notice that the secondary use request is not granted (not illustrated).

As an aspect of transmitting the exceptional permission request to the author or the like (503), the work management server (501) may adopt the following methods. A person in charge on the work management server (501) side makes an inquiry by telephone to the author or the like (503) as to whether the exception may be granted; send by fax a message as to whether the exception may be granted to the fax machine used by the author or the like (503); send an email as to whether the exception may be granted to the email address used by the author or the like (503); send from the work management server (501) side a message as to whether the exception may be granted to the author or the like (503) through a social networking server (SNS); transmit data regarding whether the exception may be granted to an application used by the author or the like (503) for work management Also, in response to the transmission of the exceptional permission request to the author or the like (503) (564), the work management server (501) may transmit a message to the user terminal (502) that an agreement, regarding whether the change in the content may be permitted, of the author or the like (503) is being confirmed.

In response to the reception of the message that the agreement is being confirmed, the user terminal (502) may display a notice "confirming agreement of author" in a document (531) being created by the user (532), for example.

Figure 5C:
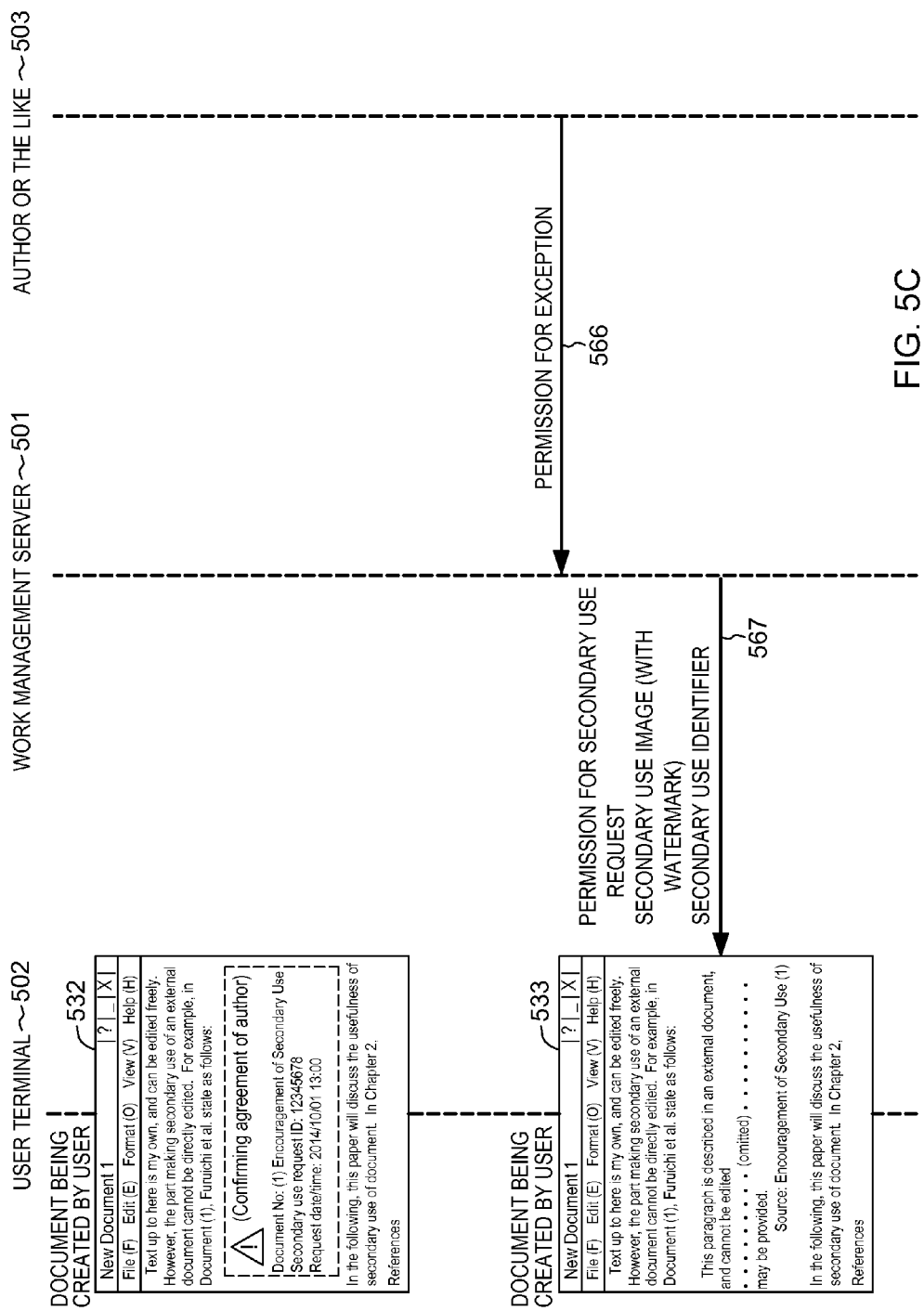

FIG. 5C illustrates an aspect where the work management server (501) is giving permission to a secondary use request from the user terminal (502) in response to permission by the author or the like (503) of the exceptional permission request, and where content for secondary use (for example, an image or a PDF which is set to not allow editing) is inserted in the document (531) being created by the user.

It is assumed that the work management server (501) obtains permission or denial of the exception from the author or the like (503). As an aspect of the work management server (501) obtaining permission or denial of the exception from the author or the like (503), the following methods may be adopted, for example. A person in charge on the work management server (501) side receives by telephone from the author or the like (503) a notice to the effect that the exception is granted or denied; the work management server (501) side receives a reply by fax from the author or the like (503) to the effect that the exception is granted or denied; the work management server (501) side receives an email from the author or the like (503) to the effect that the exception is granted or denied; the work management server (501) side receives a message from the author or the like (503) through SNS to the effect that the exception is granted or denied; the work management server (501) receives from the application used by the author or the like (503) for work management data to the effect that the exception is granted or denied; the author or the like (503) accesses the work management server (501), and checks a checkbox indicating grant or denial of the exception, and the check is recognized by the work management server (501).

Additionally, the method used in an aspect of transmission of the exceptional permission request to the author or the like (503) and the method used in an aspect of obtaining permission or denial of the exception from the author or the like (503) do not have to coincide, and an aspect of transmission of the exceptional permission request to the author or the like (503) may be fax, and an aspect of obtaining permission or denial of the exception from the author or the like (503) may be telephone, for example.

In response to the acquisition of permission for the exception from the author or the like (503) (566), the work management server (501) may edit the content which is the target of secondary use so that the format of the content which is the target of secondary use is in accordance with the format of the paste destination (that is, the document being created by the user). For example, the work management server (501) may execute editing to make the format of the content which is the target of secondary use the same as the format of the paste destination, and moreover, execute conversion into an image or a PDF which is set to not allow editing so as to disable editing of the edited content. Then, the work management server (501) transmits, to the user terminal (502), the permission notification for the secondary use request, the edited content which is the target of secondary use (in a mode not allowing editing of the text), and the secondary use request identifier (567).

In response to the reception of the permission notification for the secondary use request, the edited content which is the target of secondary use, and the secondary use request identifier, the user terminal (502) displays the edited content by inserting the same into the document (531) being created by the user or by embedding the same in the document (531) being created by the user (533). Furthermore, the user terminal (502) may embed the secondary use request identifier in the content inserted in an aspect not allowing editing, or may display the secondary use request identifier on the screen near the inserted content. Moreover, the user terminal (502) may embed, in the edited content inserted in a mode not allowing editing, the source of the edited content (or the title of the electronic work) inserted in a mode not allowing editing, or may display the source, on the screen, near the inserted edited content or in a section for reference documents.

Figure 5D:
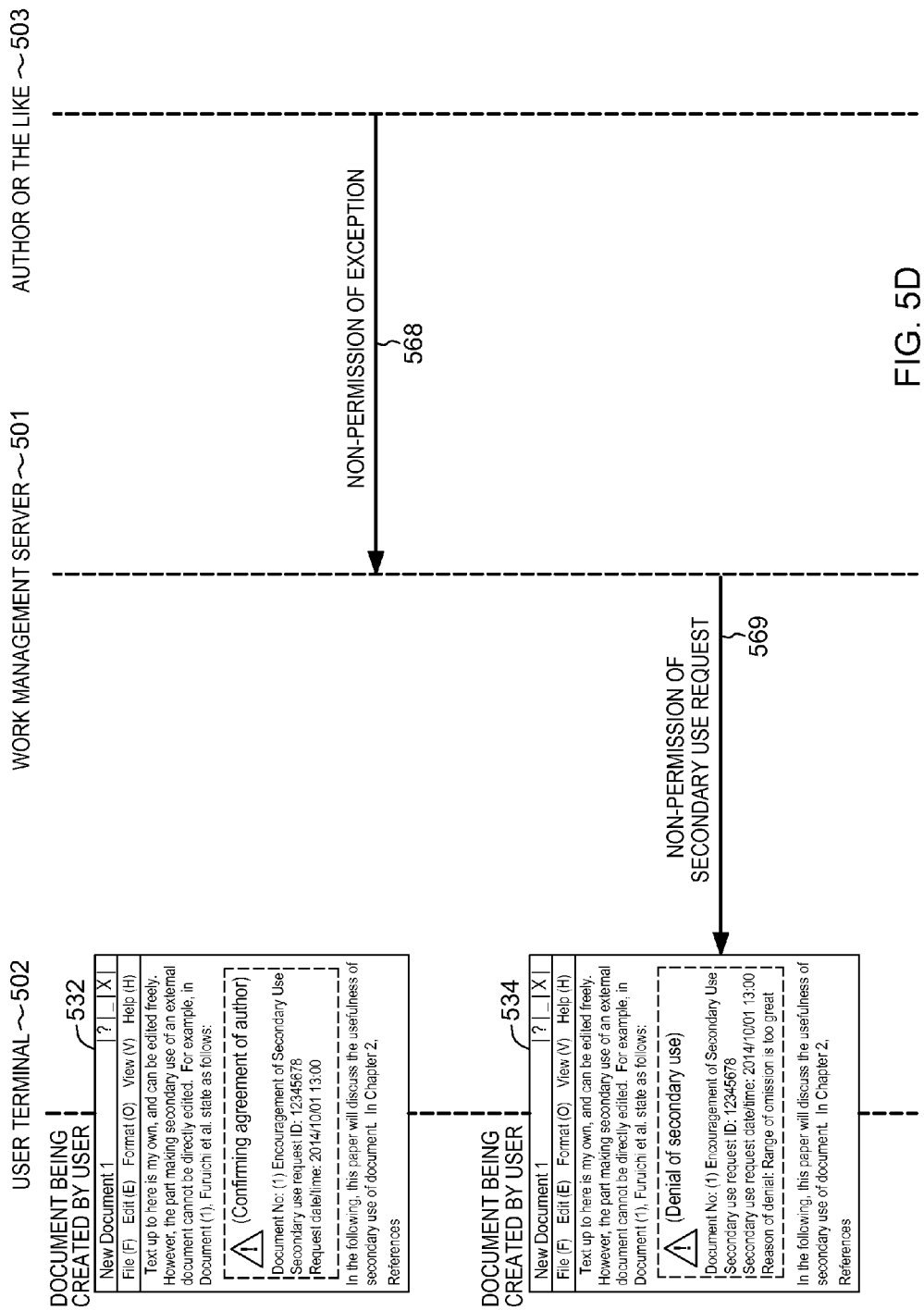

FIG. 5D illustrates an aspect where the work management server (501) is not giving permission to a secondary use request from the user terminal (502) in response to denial by the author or the like (503) of the exceptional permission request, and where a message to the effect that secondary use by changing the content is not permitted is displayed in the document (531) being created by the user.

It is assumed the work management server (501) or the person in charge on the work management server (501) side is denied the exceptional permission by the author or the like (503).

In response to the denial by the author or the like (503) of the exceptional permission (568), the work management server (501) transmits, to the user terminal (502), a non-permission notification for the secondary use request and the secondary use request identifier (569).

In response to the reception of the non-permission notification for the secondary use request and the secondary use request identifier, the user terminal (502) displays the notice indicating non-permission (notice indicating denial of secondary use) by inserting the same into the document (531) being created by the user or by embedding the same in the document (531) being created by the user (534).

Figure 6A:
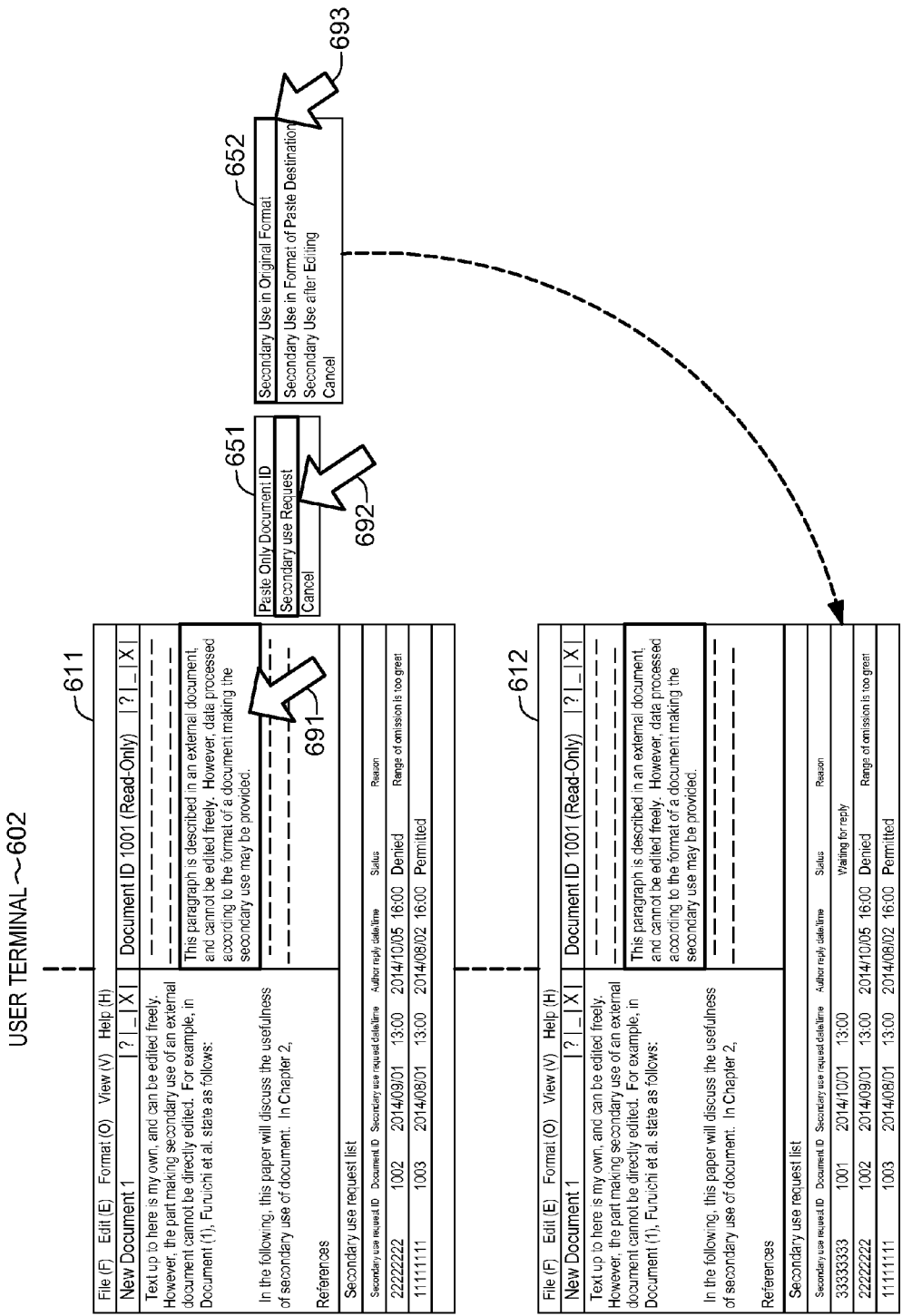
FIG. 6A illustrates an example, according to an aspect of the present invention, of supporting secondary use of content of an electronic work by a user terminal displaying next to each other on a screen content of an electronic work and a document being created by a user and centrally managing on the screen the states of a plurality of secondary use requests.

FIGS. 6A and 6B illustrate an example, according to an aspect of the present invention, of supporting secondary use of content of an electronic work by a user terminal displaying next to each other on a screen content of an electronic work and a document being created by a user and centrally managing on the screen the states of a plurality of secondary use requests.

FIG. 6A illustrates an aspect where a user terminal (602) displays next to each other on a screen a document being created and content of an electronic work, and where a user selects on the screen the text the secondary use of which is desired.

It is assumed that a user is viewing an electronic work on the user terminal (602), and is trying to make a secondary use of a part of the content of the electronic work in a document "New Document 1" being created by the user.

The user terminal (602) displays, on a screen (611), next to each other the document being created by the user ("New Document 1") and content of an electronic work (document ID: 1001). Also, the user terminal (602) displays, on the screen (611), the states of a plurality of secondary use requests as a "secondary use request list". The secondary use request list may include items of a secondary use request ID, a document ID, a secondary use request date/time, a reply date/time (date/time of a reply from the work management server), the status, and a reason (the reason of denial in the status), for example.

The user browses the content of the electronic work on the screen (611). However, although the electronic work displayed on the screen (611) may be browsed, the user cannot copy the content (for example, sentences or images) of the electronic work to the clipboard, for example, or print the content of the electronic work.

It is assumed that the user wants to insert (that is, to make a secondary use of) a text "This paragraph is described in an external document, and cannot be edited freely. However, data processed according to the format of a document making the secondary use may be provided." on the screen (611) into a document ("New Document 1") being created by the user.

The user selects the range of the text, on the screen (611), the secondary use of which is desired by dragging by a left click using a mouse or by an operating finger, for example (691).

The user terminal (602) displays the selected text in a black/white reversed manner. Also, in response to the detection of drag, the user terminal (602) displays, on the screen, a subwindow (651) for allowing the user to select the mode of secondary use. This subwindow (651) includes, with respect to the text which has been dragged and dropped, an option of "paste only document ID" of the electronic work the user is browsing, an option of issuing a "secondary use request", and an option of "cancel" of the secondary use request.

In is assumed that the user selects "secondary use request" in the subwindow (651) by the mouse or the operating finger, for example (692).

In response to the selection of "secondary use request" in the subwindow (651), the user terminal (602) further displays on the screen a subwindow (652) to enable the user to select the mode of secondary use. This subwindow (652) includes, with respect to the text which has been dragged and dropped, an option of "secondary use in original format", an option of "secondary use in format of paste destination", an option of "secondary use after editing", and an option of "cancel" of the process of insertion of the text which has been dragged and dropped into the document ("New Document 1") being created by the user. The format of a paste destination refers to the format used in the document being created by the user or a dedicated format for the paragraph where the text which has been dragged and dropped is to be inserted or embedded.

It is assumed that the user selects "secondary use in original format" in the subwindow (652) by the mouse or the operating finger, for example (693).

According to the selection of "secondary use in original format" in the subwindow (652), the user terminal (602) transmits a secondary use request requesting secondary use of the selected text (that is, content of the electronic work) to the work management server, together with a unique secondary use request identifier that is associated with the secondary use request (not illustrated). This secondary use request identifier is an identifier for identifying the secondary use request, and may include an ID of the user (for example, a user ID), an ID of the electronic work (for example, an ISBN), and the transmission date/time of the secondary use request, for example.

In response to the transmission of the secondary use request to the work management server, the user terminal (602) adds, in the secondary use request list, a section that is associated with the secondary use request (a section whose secondary use request ID is "33333333"). The status in the added section is "waiting for reply".

FIG. 6B illustrates an aspect where the user terminal (602) displays next to each other on a screen a document being created and content of an electronic work, and where a user makes secondary use, in the document being created, on the screen, of text the secondary use of which is permitted.

In response to the reception of a permission notification for secondary use, edited content which is the target of secondary use, and the secondary use request identifier from the work management server, the user terminal (602) changes the status in the section which has been added in the secondary use request list from "waiting for reply" to "permitted" (613).

In response to the status changing to "permitted", the user drags the section which has been added to the document ("New Document 1") being created by the user (694).

In response to the dragging of the section which has been added on the screen (613), the user terminal (602) adds the edited content which is the target of secondary use and which is associated with the section which has been added in the document ("New Document 1") being created by the user (614).

Figure 7:
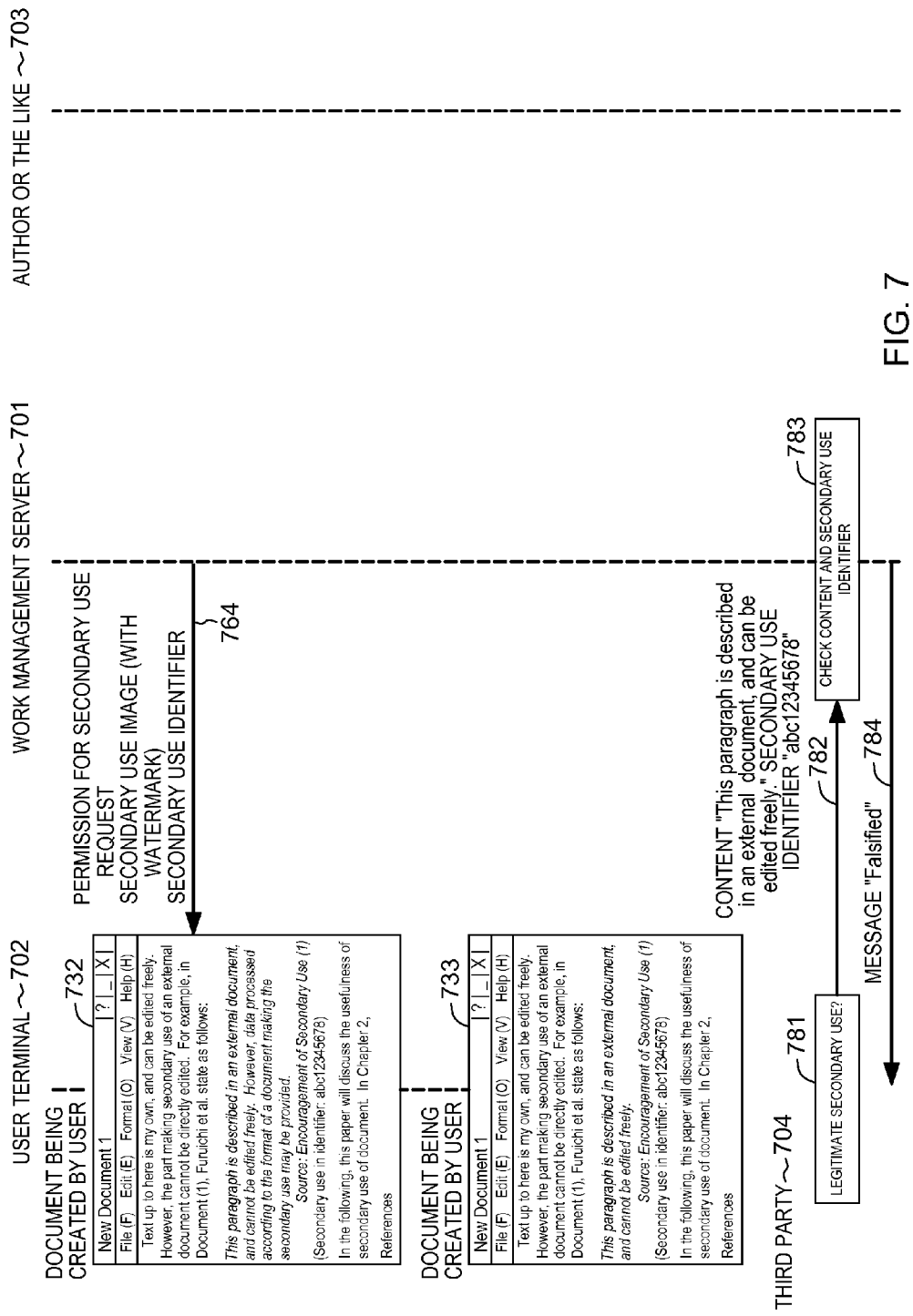
FIG. 7 illustrates a process, according to an aspect of the present invention, of examining, with respect to a document of a user where a secondary use of an electronic work is made, whether the secondary use is legitimate.

FIG. 7 illustrates a process, according to an aspect of the present invention, of examining, with respect to a document of a user where a secondary use of an electronic work is made, whether the secondary use is legitimate.

A screen (732) is a screen after a permission for a secondary use request is obtained (764) from a work management server (701) with respect to a document being created by the user, and displays edited content which is the target of secondary use.

However, the user is then assumed to have falsified the edited content which is the target of secondary use (733). That is, it is assumed that the user changed the edited content which is the target of secondary use, "This paragraph is described in an external document, and cannot be edited freely. However, data processed according to the format of a document making the secondary use may be provided.", to "This paragraph is described in an external document, and can be edited freely."

It is assumed that, after falsification by the user is performed, a third party (for example, a peer reviewer of the document) (704) wants to examine whether the secondary use in the document is a legitimate secondary use (781).

The third party inputs, via the web browser of an examination terminal (for example, a computer), the secondary use part "This paragraph is described in an external document, and can be edited freely." in the document and a secondary use identifier "abc12345678" that is associated with the secondary use part. The examination terminal transmits the secondary use part in the document and the secondary use identifier to the work management server (701) (782).

In response to the reception of the secondary use part in the document and the secondary use identifier from the examination terminal, the work management server (701) extracts legitimate content associated with the received secondary use identifier from a storage device storing the secondary use identifier and the legitimate content associated with the secondary use identifier. Then, the work management server (701) executes comparison as to whether the received secondary use part and the legitimate content extracted from the storage device coincide.

In response to the received secondary use part coinciding with the legitimate content extracted from the storage device, the work management server (701) transmits a message "corresponding part is legitimate secondary use" to the examination terminal (not illustrated). On the other hand, in response to the received secondary use part not coinciding with the legitimate content extracted from the storage device, the work management server (701) transmits a message "corresponding part is falsified" to the examination terminal (784).

The third party is thereby enabled to examine whether a secondary use part is a legitimate secondary use.

Figure 8A:
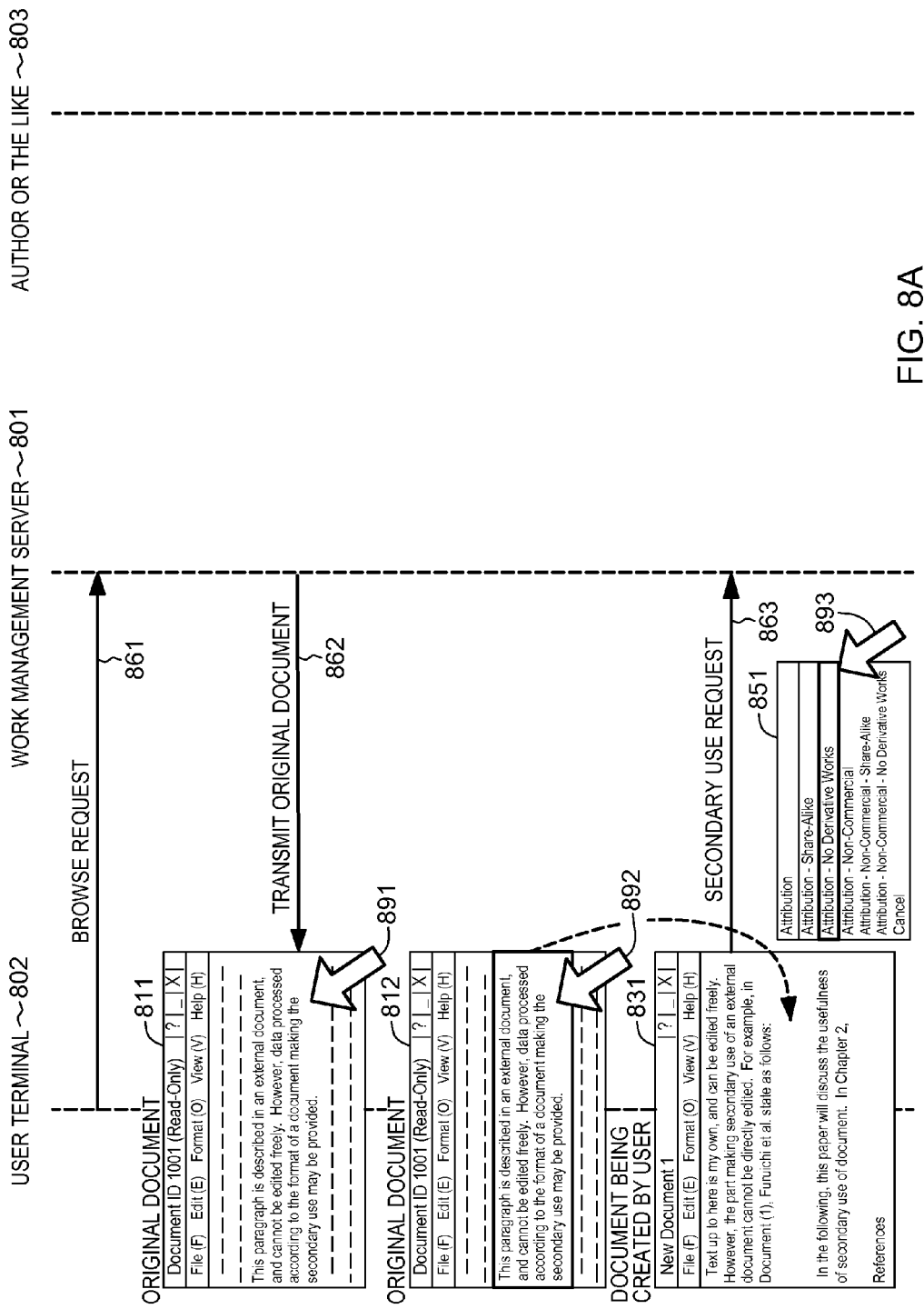
FIG. 8A illustrates an example, according to an aspect of the present invention, of supporting secondary use of content of an electronic work by using a secondary use mark by which the right holder of the electronic work attaches the level of secondary use of the electronic work.

FIG. 8A illustrates an example, according to an aspect of the present invention, of supporting secondary use of content of an electronic work by using a secondary use mark by which the right holder of the electronic work attaches the level of secondary use of the electronic work.

FIG. 8A illustrates an aspect where a user is viewing an electronic work, and is trying to make a secondary use of a part of the content of the electronic work in a document "New Document 1" being created by the user.

Each of the processes (861 and 862) illustrated in FIG. 8A is the same as each of the processes (261 and 262) illustrated in FIG. 2A. Accordingly, description of each of the processes (261 and 262) illustrated in FIG. 2A should be referred to with respect to each of the processes (861 and 862) illustrated in FIG. 8A.

In response to the detection of drag and drop at an insertion desired position in a document (831) being created by a user by the mouse or the operating finger, for example, a user terminal (802) displays, on the screen, a subwindow (851) for allowing the user to select the mode of secondary use. This subwindow (851) displays a secondary use mark by which the right holder of the electronic work attaches the level of secondary use of the electronic work.

The secondary use mark may be an icon with letters or a graphic indicating the level of secondary use, letters indicating the level of secondary use, or a combination thereof. In the case where the secondary use mark is a graphic indicating the level of secondary use, the secondary use mark may be any of various icons specified by Creative Commons license, for example. For details of these various icons, see the following URL describing the Creative Commons license: "URL:http://creativecommons.jp/licenses/". Moreover, in the case where the secondary use mark is letters indicating the level of secondary use, to conform to the various icons of the Creative Commons license, it may be an option according to which the condition of secondary use is "attribution", an option according to which the condition of secondary use is "attribution—share-alike", an option according to which the condition of secondary use is "attribution—no derivative works", an option according to which the condition of secondary use is "attribution—non-commercial", an option according to which the condition of secondary use is "attribution—non-commercial—share-alike", an option according to which the condition of secondary use is "attribution—non-commercial—no derivative works", and an option of "cancel" of the process of insertion of the text which has been dragged and dropped into the document (831) being created by the user. The "attribution" is to give credit with respect to an electronic work, and the "share-alike" is to publish under a CC license of the same combination as the original electronic work, and the "no derivative works" is prohibition of derivatives based on the original work, and the "non-commercial" is prohibition of use for commercial purposes.

The subwindow (851) includes an option according to which the condition of secondary use is "attribution", an option according to which the condition of secondary use is "attribution—share-alike", an option according to which the condition of secondary use is "attribution—no derivative works", an option according to which the condition of secondary use is "attribution—non-commercial", an option according to which the condition of secondary use is "attribution—non-commercial—share-alike", an option according to which the condition of secondary use is "attribution—non-commercial—no derivative works", and an option of "cancel" of the process of insertion of the text which has been dragged and dropped into the document (831) being created by the user.

It is assumed that the user selects "attribution—no derivative works" in the subwindow (851) by the mouse or the operating finger, for example (893).

In response to the selection of "attribution—no derivative works" in the subwindow (851), the user terminal (802) transmits, to the work management server (801), a secondary use request requesting secondary use of the selected text (that is, content of the electronic work) (863). The secondary use request may include, for example, the document ID and the range of the content for the secondary use (for example, specification by page, paragraph or line for secondary use is possible), and the selected secondary use mark "attribution—no derivative works".

Furthermore, in one aspect, the user terminal (802) may transmit to the work management server (801), together with the secondary use request, a unique secondary use request identifier that is associated with the secondary use request (863). This secondary use request identifier is an identifier for identifying the secondary use request, and may include an ID of the user (for example, a user ID), an ID of the electronic work (for example, an ISBN), and the transmission date/time of the secondary use request, for example.

In response to the reception of the secondary use request (and the secondary use request identifier), the work management server (801) determines whether the secondary use request satisfies the secondary use policy that is associated with the secondary use mark "attribution—no derivative works".

Figure 8B:
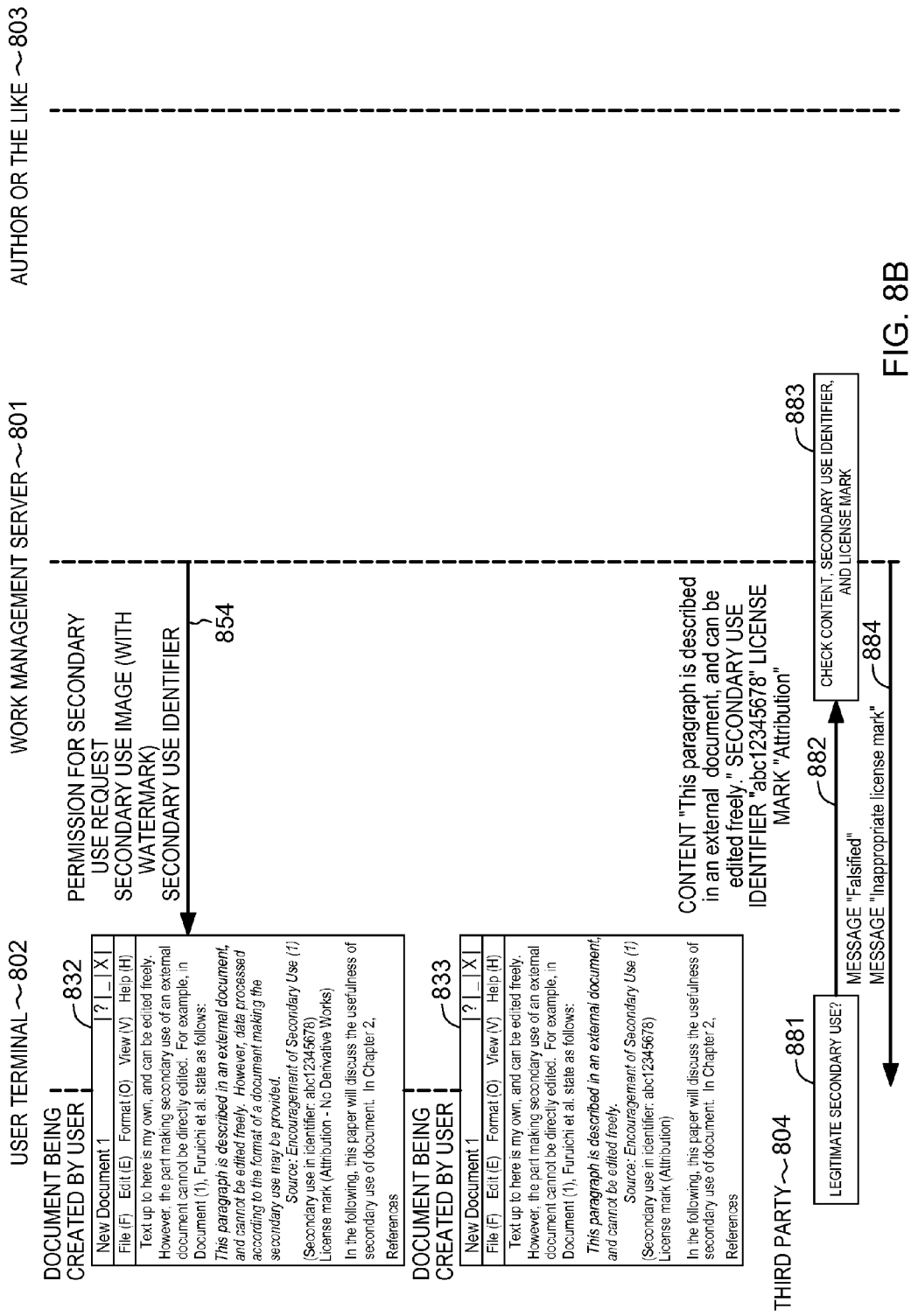
FIG. 8B illustrates an example, according to an aspect of the present invention, of supporting secondary use of content of an electronic work by using a secondary use mark by which the right holder of the electronic work attaches the level of secondary use of the electronic work.

FIG. 8B illustrates an aspect where the work management server (801) is giving permission to a secondary use request from the user terminal (802), and where the user is trying to re-edit the content (for example, an image or a PDF which is set to not allow editing) inserted in the document "New Document 1" being created by the user.

In response to the secondary use request satisfying the secondary use policy that is associated with the secondary use mark, the work management server (801) transmits, to the user terminal (802), a permission notification for the secondary use request, the content which is the target of secondary use (in a mode not allowing editing of the text), and the secondary use request identifier (854). Moreover, the work management server (801) may edit the content which is the target of secondary use so that the format of the content which is the target of secondary use is in accordance with the format of the paste destination (that is, the document being created by the user). For example, the work management server (801) may execute editing to make the format of the content which is the target of secondary use the same as the format of the paste destination, and moreover, execute conversion into an image or a PDF which is set to not allow editing so as to disable editing of the edited content. Then, the work management server (801) transmits, to the user terminal (802), the permission notification for the secondary use request, the edited content which is the target of secondary use (in a mode not allowing editing of the text), and the secondary use request identifier (854).

A mode not allowing editing may be an image or a PDF which is set to not allow editing (that is, a PDF editing of whose text is restricted), for example. A secondary use image may include a watermark indicating secondary use (for example, information such as the secondary use request identifier, the user ID, the document ID or the like is embedded), for example. The secondary use request identifier may be the same secondary use request identifier as the one transmitted from the user terminal (802), or one obtained by changing the secondary use request identifier (for example, one obtained by adding the result of the permission notification (Yes (for example, a numerical value "1") or No (a numerical value "0")), or a unique identifier newly generated at the work management server (801).

In response to the reception of the permission notification for the secondary use request, the edited content which is the target of secondary use, and the secondary use request identifier, the user terminal (802) displays the edited content by inserting the same into the document (831) being created by the user or by embedding the same in the document (831) being created by the user (832). Furthermore, the user terminal (802) may embed the secondary use request identifier in the content inserted in an aspect not allowing editing, or may display the secondary use request identifier on the screen near the inserted content. Moreover, the user terminal (802) may embed, in the edited content inserted in a mode not allowing editing, the source of the edited content (or the title of the electronic work) inserted in a mode not allowing editing, or may display the source, on the screen, near the inserted edited content or in a section for reference documents. Also, the user terminal (802) may display the selected secondary use mark near the inserted edited content.

A screen (832) is a screen after a permission for the secondary use request has been obtained (854) from the work management server (801) with respect to the document being created by the user, and displays edited content which is the target of secondary use.

However, the user is then assumed to have falsified the edited content which is the target of secondary use (833). That is, it is assumed that the user changed the edited content which is the target of secondary use, "This paragraph is described in an external document, and cannot be edited freely. However, data processed according to the format of a document making the secondary use may be provided.", to "This paragraph is described in an external document, and can be edited freely."

It is assumed that, after falsification by the user is performed, a third party (for example, a peer reviewer of the document) (804) wants to examine whether the secondary use in the document is a legitimate secondary use (881).

The third party inputs, via the web browser of an examination terminal (for example, a computer), the secondary use part "This paragraph is described in an external document, and can be edited freely." in the document and a secondary use identifier "abc12345678", and optionally inputs the secondary use mark "attribution". The examination terminal transmits the secondary use part in the document and the secondary use identifier, and optionally, the secondary use mark, to the work management server (801) (882).

In response to the reception of the secondary use part in the document and the secondary use identifier, and optionally, the secondary use mark, from the examination terminal, the work management server (801) extracts legitimate content associated with the received secondary use identifier from a storage device storing the secondary use identifier and the legitimate content associated with the secondary use identifier, and optionally, a secondary use mark associated with the secondary use identifier. Then, the work management server (801) executes comparison as to whether the received secondary use part and the legitimate content extracted from the storage device coincide. Also, the work management server (801) may execute comparison as to whether the received secondary use mark and the secondary use mark extracted from the storage device coincide.

In response to the received secondary use part coinciding with the legitimate content extracted from the storage device, the work management server (801) transmits a message "legitimate secondary use" to the examination terminal (not illustrated). On the other hand, in response to the received secondary use part not coinciding with the legitimate content extracted from the storage device, the work management server (801) transmits a message "falsified" to the examination terminal (884).

In response to the received secondary use mark coinciding with the secondary use mark extracted from the storage device, the work management server (801) transmits a message "license mark is legitimate" to the examination terminal (not illustrated). On the other hand, in response to the received secondary use mark not coinciding with the secondary use mark extracted from the storage device, the work management server (801) may transmit a message "inappropriate license mark" to the examination terminal (884).

The third party is thereby enabled to examine whether a secondary use part is a legitimate secondary use, and whether a secondary use mark is appropriately displayed.

Figure 9:
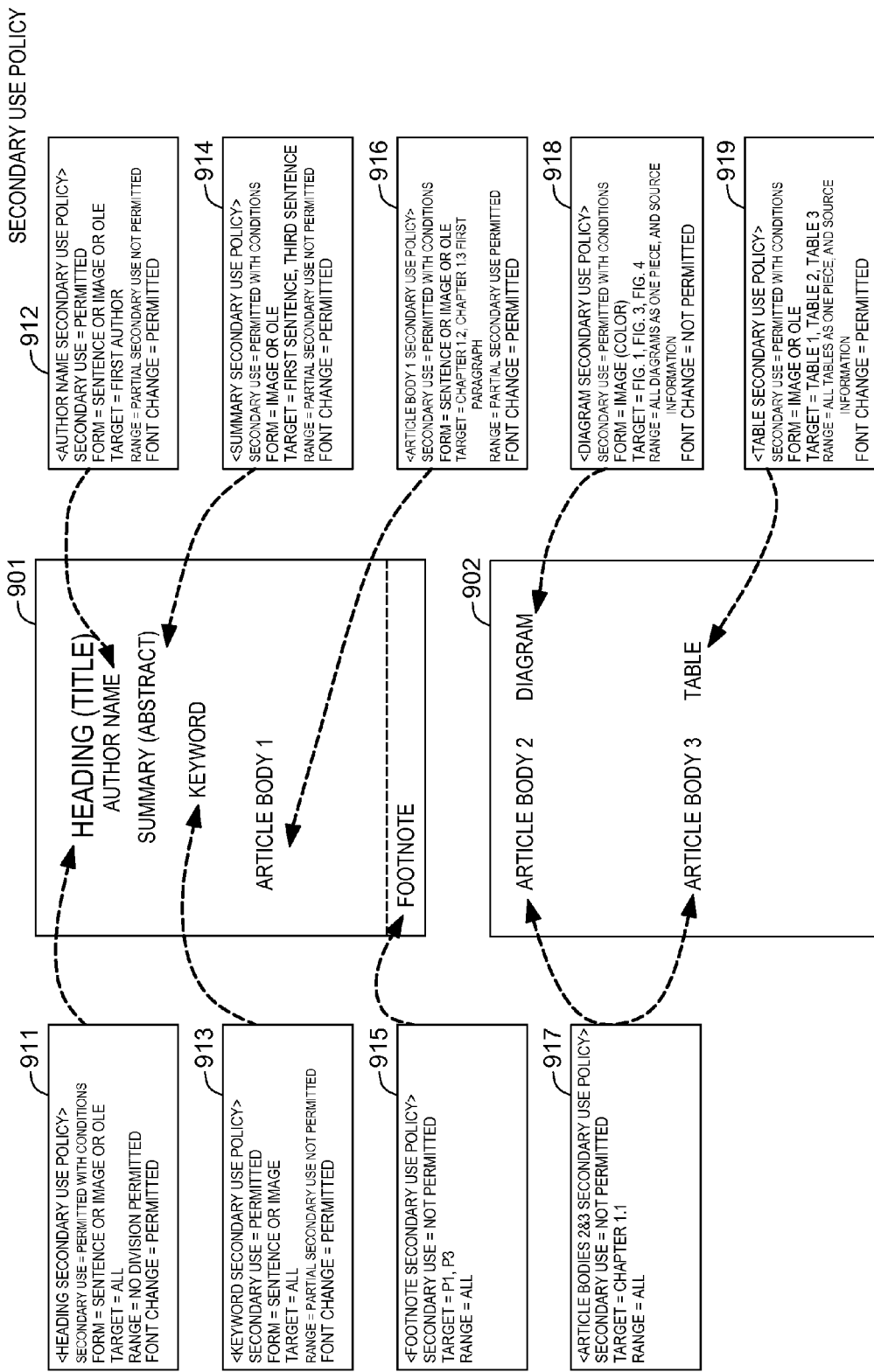
FIG. 9 illustrates an example of a secondary use policy specified by an author or the like which may be used in an aspect of the present invention.

FIG. 9 illustrates an example of a secondary use policy specified by an author which may be used in an aspect of the present invention.

The secondary use policy may be set for each of items: heading (title) of an electronic work, author name, keyword, summary (abstract), footnote, article body, diagram, and table.

An electronic work (901) illustrated in FIG. 9 illustrates an example where nine secondary policies (911 to 919) are set for respective items.

Figure 10:
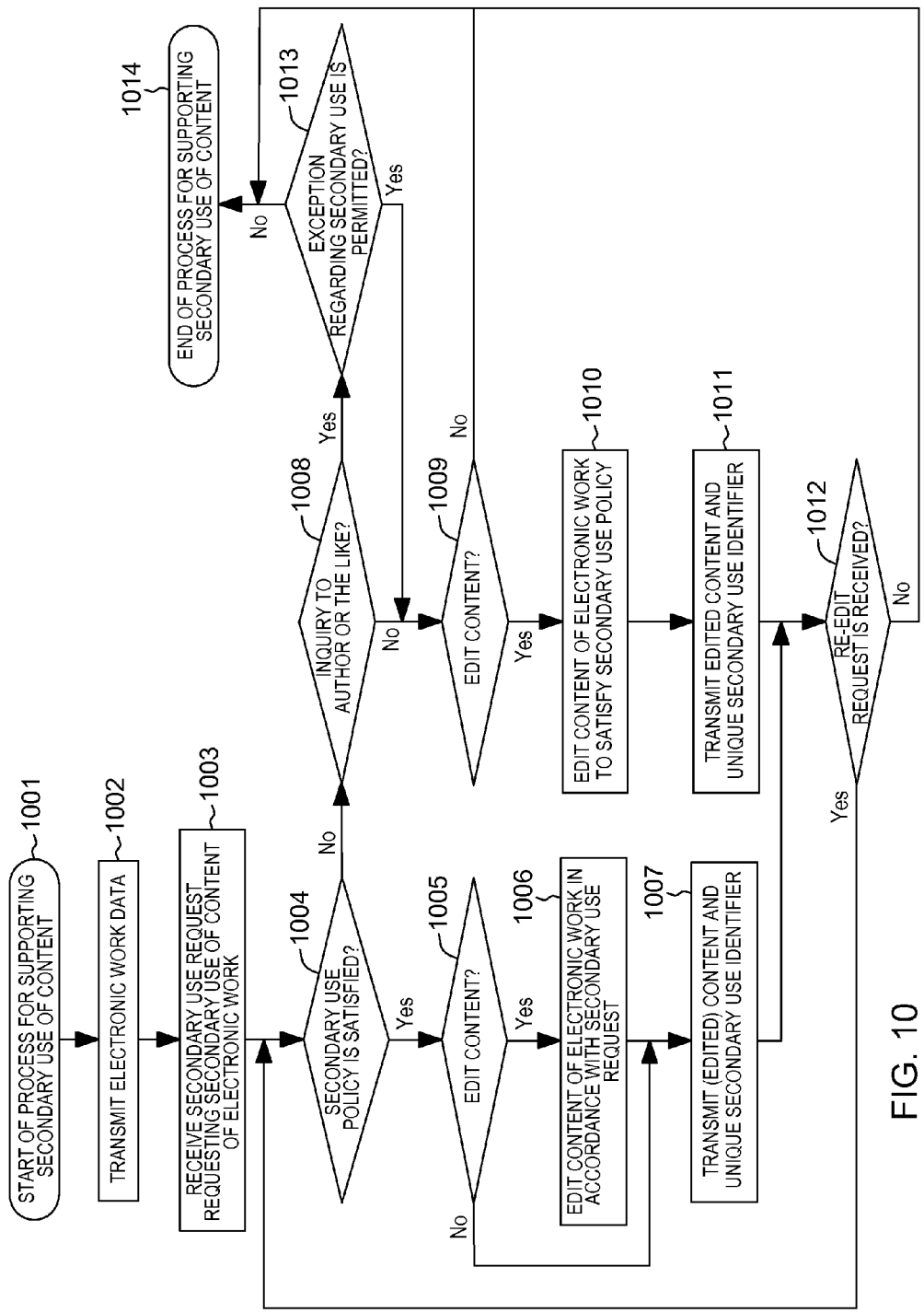
FIG. 10 illustrates a flow chart of a process for supporting secondary use of content of an electronic work by a server computer according to an aspect of the present invention.

FIG. 10 illustrates a flow chart of a process for supporting secondary use of content of an electronic work by a server computer according to an aspect of the present invention.

In step 1001, a server computer (101) which is a work management server starts a process for supporting secondary use of content of an electronic work.

In step 1002, in response to a request for content of an electronic work from a user terminal, the server computer (101) transmits the content of the electronic work to the user terminal.

In step 1003, the server computer (101) receives, from the user terminal, a secondary use request requesting a secondary use of the content of the electronic work. The secondary use request may include, for example, the document ID and the range of the content for the secondary use (for example, specification by page, paragraph or line for secondary use is possible), and may optionally include the format of the content for the secondary use (for example, font, size, color, background color, maximum height, maximum width, left alignment, center alignment or right alignment of sentences, bold, italics, underlining, indentation, subscript, superscript, strike-through, or a combination of the above). Also, the server computer (101) may receive from the user terminal, together with the secondary use request, a unique secondary use request identifier that is associated with the secondary use request. This secondary use request identifier is an identifier for identifying the secondary use request, and may include an ID of the user (for example, a user ID), an ID of the electronic work (for example, an ISBN), and the transmission date/time of the secondary use request, for example.

In step 1004, the server computer (101) determines whether the secondary use request received in step 1003 satisfies the secondary use policy of the electronic work. The secondary use policy may include availability of secondary use of the content, the data type, the range allowing secondary use, the format, availability of tertiary or higher use, or a combination of the above, for example. The secondary use policy may be decided by the author, the copyright holder or the manager of the electronic work. In response to the received secondary use request satisfying the secondary use policy of the electronic work, the server computer (101) proceeds to step 1005. On the other hand, in response to the received secondary use request not satisfying the secondary use policy, the server computer (101) proceeds to step 1008.

In step 1005, the server computer (101) determines whether to edit the content which is the target of secondary use. In the case where the content which is the target of secondary use is to be edited, the server computer (101) proceeds to step 1006. On the other hand, in the case where the content which is the target of secondary use is not to be edited, the server computer (101) proceeds to step 1007.

In step 1006, the server computer (101) edits the content of the electronic work in accordance with the secondary use request. This editing may be editing (for example, correcting or processing) of the content which is the target of secondary use so that the content is in accordance with the format of the paste destination (that is, the document being created by the user), for example. Also, this editing may be conversion into an image or a PDF which is set to not allow editing so that editing of the edited content is disabled, for example.

In step 1007, the server computer (101) transmits, to the user terminal, the content or the edited content of the electronic work corresponding to the secondary use request, and the secondary use identifier that is associated with the secondary use request. This secondary use identifier may be the secondary use identifier received in step 1003, or a secondary use identifier that is newly generated at the server computer (101), or a secondary use identifier that is generated at the server computer (101) based on the secondary use identifier received in step 1003.

In step 1008, in response to the received secondary use request not satisfying the secondary use policy of the electronic work, the server computer (101) determines whether to make an inquiry to the author or the copyright holder of the electronic work or the manager (the author or the like) of the electronic work as to whether an exception where the secondary use policy is not satisfied is to be permitted. In the case of not making this inquiry, the server computer (101) proceeds to step 1009. On the other hand, in the case of making this inquiry, the server computer (101) proceeds to step 1013.

In step 1009, in the case of not making the inquiry, the server computer (101) determines whether to edit the content of the electronic work which is the target of secondary use to satisfy the secondary use policy. In the case of editing the content of the electronic work to satisfy the secondary use policy, the server computer (101) proceeds to step 1010. On the other hand, in the case of not editing the content of the electronic work to satisfy the secondary use policy, the server computer (101) proceeds to the end step 1014.

In step 1010, in the case of executing editing to satisfy the secondary use policy, the server computer (101) edits the content to satisfy the secondary use policy.

In step 1011, the server computer (101) transmits, to the user terminal, the edited content corresponding to the secondary use request and the secondary use identifier that is associated with the secondary use request. This secondary use identifier may be the secondary use identifier received in step 1003, or a secondary use identifier that is newly generated at the server computer (101), or a secondary use identifier that is generated at the server computer (101) based on the secondary use identifier received in step 1003.

In step 1012, the server computer (101) determines whether a re-edit request for the (edited) content transmitted in step 1007 or 1011 is received from the user terminal. In response to reception of the re-edit request, the server computer (101) returns the process to step 1004, and repeats the process from step 1004. On the other hand, in response to not receiving the re-edit request for a predetermined period of time, for example, the server computer (101) proceeds to the end step 1014.

In step 1013, in response to reception of a permission for an exception regarding secondary use from the author or the like, the server computer (101) proceeds to step 1009. On the other hand, in response to not receiving a permission for an exception regarding secondary use from the author or the like (that is, denial of permission for an exception regarding secondary use), the server computer (101) proceeds to the end step 1014.

In step 1014, the server computer (101) ends the process for supporting secondary use of the content of the electronic work.

Figure 11:
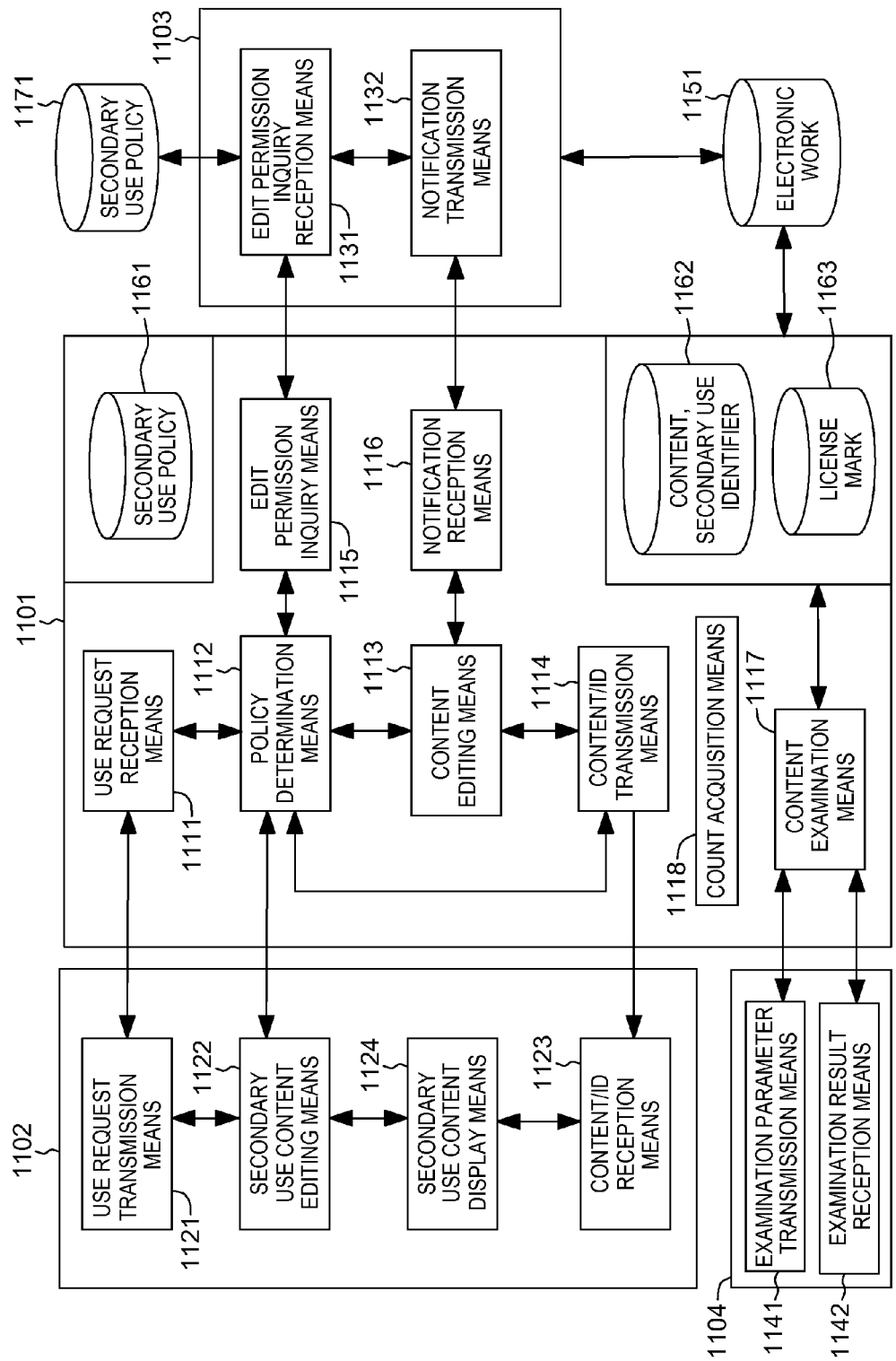
FIG. 11 illustrates a functional block diagram of a server computer which has the hardware configuration according to FIG. 1 and which is for supporting secondary use of content of an electronic work according to an aspect of the present invention, and an example of a user terminal.

FIG. 11 illustrates a functional block diagram of a server computer (1101) which has the hardware configuration according to FIG. 1 and which is for supporting secondary use of content of an electronic work according to an aspect of the present invention, and an example of a user terminal (1102).

The server computer (1101) includes use request reception means (1111), policy determination means (1112), content editing means (1113), and content/ID transmission means (1114), and optionally includes edit permission inquiry means (1115), notification reception means (1116), content examination means (1117), and count acquisition means (1118).

The use request reception means (1111) receives a secondary use request requesting secondary use of content of an electronic work (1151) from the user terminal (1102). The use request reception means (1111) may also receive, together with the secondary use request requesting secondary use of content of the electronic work (1151), a unique secondary use request identifier that is associated with the secondary use request.

Furthermore, the use request reception means (1111) may receive a re-edit request requesting re-editing of edited content from the user terminal (1102).

Moreover, the use request reception means (1111) may further receive, together with the re-edit request requesting re-editing of edited content, a unique re-edit request identifier generated at the user terminal (1102).

Moreover, the use request reception means (1111) may execute steps 1003 and 1012 illustrated in FIG. 10.

The policy determination means (1112) determines whether the secondary use request received by the use request reception means (1111) satisfies a secondary use policy (1161) of the electronic work (1151).

Also, the policy determination means (1112) may determine whether the re-edit request received by the use request reception means (1111) satisfies the secondary use policy.

Moreover, the policy determination means (1112) may execute step 1004 described in FIG. 10.

The content editing means (1113) edits content of the electronic work (1151) to satisfy the secondary use request and secondary use policy (1161).

Furthermore, the content editing means (1113) may edit content based on the secondary use request in response to reception of a notification permitting editing not satisfying the secondary use policy (1161) from an author, a copyright holder or a manager (author or the like) (1103).

Furthermore, the content editing means (1113) may re-edit the edited content to satisfy the re-edit request received by the use request reception means (1111) and the secondary use policy (1161).

Moreover, the content editing means (1113) may execute steps 1005 and 1006, and steps 1009 and 1010 described in FIG. 10.

The content/ID transmission means (1114) (or content transmission means) transmits, to the user terminal (1102), together with a unique secondary use identifier (1162) that is associated with the secondary use request, content of the electronic work (1151) based on determination by the policy determination means (1112) or edited content (1162) based on determination by the policy determination means (1112).

Also, the content/ID transmission means (1114) may further transmit, to the user terminal (1102), a secondary use mark (1163) by which the right owner of the electronic work (1151) attaches the level of secondary use. The content/ID transmission means (1114) may give authentication to the secondary use mark (1163), and verify that the secondary use mark (1163) is legitimately authenticated.

Moreover, the content/ID transmission means (1114) may execute steps 1007 and 1011 described in FIG. 10.

In response to the secondary use request not satisfying the secondary use policy (1161), the edit permission inquiry means (1115) transmits, to the author or the like (1103), an inquiry as to whether editing not satisfying the secondary use policy (1161) is to be permitted. This editing may be omission of a part of display of content (including a text, a table, or a diagram, for example) and insertion of (omitted) or (snip), addition of a footnote to a secondary use part, trimming of a secondary use image, or change in the expression.

Moreover, the edit permission inquiry means (1115) may execute step 1008 described in FIG. 10.

The notification reception means (1116) receives, from the author or the like (1103), a notification permitting editing not satisfying the secondary use policy (1161) or a notification of denial of the editing.

Moreover, the notification reception means (1116) may execute step 1013 described in FIG. 10.

The content examination means (1117) stores a secondary use request and a unique secondary use identifier (1162) associated with the secondary use request, and content (1162) transmitted to the user terminal (1102) in response to the secondary use request, receives a unique secondary use identifier and content transmitted from the computer of a third party, and determines whether the unique identifier (1162) and the content (1162) stored coincide respectively with the unique identifier and the content transmitted from the computer of the third party, and determines that secondary use of the content is within the range of the secondary use request when the unique identifier (1162) and the content (1162) stored coincide respectively with the unique identifier and the content transmitted from the computer of the third party, and if otherwise, determines that the range of the secondary use request is exceeded. Then, in the case where the secondary use of the content is within the secondary use request, the content examination means (1117) transmits a message to the effect that the secondary use of the content is legitimate to the computer (1104) of the third party. Also, in the case where the secondary use of the content exceeds the range of the secondary use request, the content examination means (1117) transmits a message to the effect that the secondary use of the content is falsified to the computer (1104) of the third party.

Furthermore, the content examination means (1117) stores a secondary use request, a unique secondary use identifier (1162) associated with the secondary use request, content (1162) transmitted to the user terminal (1102) in response to the secondary use request, and a secondary use mark (1163), receives a unique secondary use identifier, content, and a secondary use mark transmitted from the computer of a third party, and determines whether the unique identifier (1162), the content (1162), and the secondary use mark (1163) stored coincide respectively with the unique identifier, the content, and the secondary use mark transmitted from the computer of the third party, and determines that secondary use of the content is within the range of the secondary use request when the unique identifier (1162), the content (1162), and the secondary use mark (1163) stored coincide respectively with the unique identifier, the content, and the secondary use mark transmitted from the computer of the third party, and if otherwise, determines that the range of the secondary use request is exceeded. Then, in the case where the secondary use of the content is within the secondary use request, the content examination means (1117) transmits a message to the effect that the secondary use of the content is legitimate to the computer (1104) of the third party. Also, in the case where the secondary use of the content exceeds the range of the secondary use request, the content examination means (1117) transmits a message to the effect that the secondary use of the content is falsified to the computer (1104) of the third party.

The count acquisition means (1118) (corresponding to secondary use frequency count means) acquires the frequency of secondary use of the electronic work (1151) in other documents, particularly, the latest secondary use frequency in other documents, from a server computer (for example, a document management database) accumulating the secondary use frequency, for example. The secondary use frequency is information indicating the number of times of secondary use in other documents. This secondary use frequency may be one of indices indicating the reliability or importance of an electronic work. For example, the document management database manages, for each document, the number of other documents making secondary use of the document. The count acquisition means (1118) may provide the secondary use frequency to the user terminal (1102) together with content. By providing the secondary use frequency together with content, the reliability of the electronic work may be conveyed to the user. Furthermore, the count acquisition means (1118) may provide, to the user terminal (1102), together with the secondary use frequency, a list of other documents making secondary use of the electronic work.

The user terminal (1102) includes use request transmission means (1121), secondary use content editing means (1122), content/ID reception means (1123), and secondary use content display means (1124).

The use request transmission means (1121) transmits a secondary use request from a user to the server computer (1101).

The secondary use content editing means (1122) enables, before a user obtains permission for secondary use of content which is the target of secondary use, editing desired by the user on the content.

The content/ID reception means (1123) receives (edited) content and a secondary use request identifier transmitted from the content/ID transmission means (1114) of the server computer (101).

Also, the content/ID reception means (1123) may further receive a secondary use mark (1163) by which the right owner of the electronic work (1151) attaches the level of secondary use.

The secondary use content display means (1124) displays content for secondary use by inserting or embedding the same in the document being created by the user.

As one aspect, in the case where the terminal of the author or the like is a computer (1103), the computer (1103) may include edit permission inquiry reception means (1131) and notification transmission means (1132).

The edit permission inquiry reception means (1131) receives an inquiry transmitted from the edit permission inquiry means (1115) of the server computer (101). The edit permission inquiry reception means (1131) may display, for the author or the like, on a screen, options of permission and denial regarding editing not satisfying the secondary use policy (1171), for example.

The notification transmission means (1132) transmits, to the server computer (101), a reply (that is, permission for editing not satisfying the secondary use policy (1161), or denial of the editing) of the author or the like to the inquiry transmitted from the edit permission inquiry means (1115) of the server computer (101).

Furthermore, in the case where the terminal of the author or the like is a telephone (1103), this telephone (1103) may receive a reply (that is, permission for editing not satisfying the secondary use policy (1161), or denial of the editing) of the author or the like, based on pressing of a dial number "1" (for permission) or a dial number "0" (for denial), for example, for the inquiry transmitted from the edit permission inquiry means (1115).

The computer (1104) of a third party includes examination parameter transmission means (1141) and examination result reception means (1142).

The examination parameter transmission means (1141) transmits, to the server computer (101), content to be examined in an electronic work, and a secondary use identifier that is associated with the secondary use part.

Also, the examination parameter transmission means (1141) may transmit, to the server computer (101), content to be examined in an electronic work, a secondary use identifier that is associated with the secondary use part, and a secondary use mark that is associated with the secondary use part.

The examination result reception means (1142) receives a message (that is, a message to the effect that secondary use of the content is legitimate, or a message to the effect that secondary use of the content is falsified) transmitted from the content examination means (1117) of the server computer (101).

The examination result reception means (1142) may notify a third party of the received message, and may cause the received message to be displayed on the screen of the computer (1104) of the third party.

As described herein, aspects of the present invention provide a technique for supporting secondary use of content of an electronic work. This technique may include a method for supporting secondary use of content of the electronic work, and a server computer for supporting secondary use of content of the electronic work, a program for the server computer, and a program product for the server computer.

In one aspect of the present invention, a method for supporting secondary use of content of an electronic work includes the following, executed by a server computer, of receiving, from a user terminal, a use request requesting secondary use of the content of the electronic work, where a secondary use policy of an author or a copyright holder of the electronic work or a manager of the electronic work is associated with the electronic work, determining whether the use request satisfies the secondary use policy, and transmitting, to the user terminal, together with a unique identifier associated with the use request, content of the electronic work based on the determination or edited content based on the determination.

In one example, the server computer may further edit content of the electronic work to satisfy the use request and the secondary use policy. In this case, the transmitting may include transmitting the edited content to the user terminal.

In a further aspect, the editing may further include transmitting, to the author, the copyright holder, or the manager, in response to the use request not satisfying the secondary use policy, an inquiry as to whether editing not satisfying the secondary use policy is to be permitted, and editing the content based on the use request in response to reception, from the author, the copyright holder, or the manager, of a notification to an effect that editing not satisfying the secondary use policy is permitted. In this case, transmitting may include transmitting edited content based on the use request to the user terminal.

In one aspect of the present invention, the server computer may further acquire a secondary use frequency of the electronic work. In this case, the editing may further include adding the secondary use frequency of the electronic work to the content.

In a further aspect of the present invention, the server computer may further receive, from the user terminal, a re-edit request requesting re-editing of the edited content, determine whether the re-edit request satisfies the secondary use policy, and transmit, to the user terminal, re-edited content based on the determination together with a unique identifier associated with the re-edit request.

In a further aspect of the present invention, the server computer may further re-edit the edited content to satisfy the re-edit request and the secondary use policy.

In one example, the re-editing may further include transmitting, to the author, the copyright holder, or the manager, in response to the re-edit request not satisfying the secondary use policy, an inquiry as to whether re-editing not satisfying the secondary use policy is to be permitted, and re-editing the content based on the re-edit request in response to reception, from the author, the copyright holder, or the manager, of a notification to an effect that re-editing not satisfying the secondary use policy is permitted.

In one example, the re-editing may further include a step of re-editing, in a case where a notification to an effect that editing not satisfying the secondary use policy is permitted is already received, the content based on the re-edit request in response to the re-edit request not satisfying the secondary use policy.

In a further aspect, the receiving the use request from the user terminal may further include receiving a unique identifier generated at the user terminal. In this case, the unique identifier associated with the use request may be the unique identifier generated at the user terminal or an identifier generated based on this identifier.

In one example, the unique identifier associated with the use request may be an identifier generated by the server computer in response to reception of the use request, and may be an identifier associated with the received use request.

In yet a further aspect, the receiving the re-edit request from the user terminal may further include receiving a unique re-edit request identifier generated at the user terminal. In this case, the unique identifier associated with the re-edit request may be the unique re-edit request identifier generated at the user terminal, or an identifier generated based on this re-edit request identifier.

In one example, the unique re-edit request identifier associated with the re-edit request may be an identifier generated by the server computer in response to reception of the re-edit request, and may be an identifier associated with the received re-edit request.

In a further example, the use request may include an attribute of the electronic work, and the attribute may include a document ID, and a secondary use range of content, and optionally, a format.

As one example, the re-edit request may include an attribute of the electronic work, and the attribute may include a document ID, and a secondary use range of content, and optionally, a format.

In one aspect of the present invention, the secondary use policy may include availability of secondary use of content, data type, a range allowing secondary use, a format, availability of tertiary or higher use, or a combination thereof.

In one example, the use request may include a document ID, and an identifier for identifying a secondary use mark by which a right owner of the electronic work attaches a level of secondary use.

The secondary use policy may include, e.g., an identifier for identifying a secondary use mark by which a right owner of the electronic work attaches a level of secondary use.

In one aspect of the present invention, the transmitting, to the user terminal, together with the unique identifier associated with the use request, content of the electronic work based on the determination or edited content based on the determination may further include transmitting, to the user terminal, the secondary use mark by which a right owner of the electronic work attaches a level of secondary use.

The server computer may further, for instance, store the use request, a unique identifier associated with the use request, and content transmitted to the user terminal in response to the use request; receive a unique identifier and content transmitted from a computer of a third party; determine whether the unique identifier and the content stored coincide respectively with the unique identifier and the content transmitted from the computer of the third party; and determine that secondary use of the content is within a range of the use request when the unique identifier and the content stored coincide respectively with the unique identifier and the content transmitted from the computer of the third party, and if otherwise, determine that the range of the use request is exceeded.

In one example, the editing may edit the content by converting the content into an image, omitting a part of the content, transmitting after adjusting a format, deciding a range of secondary use of the content, adding a source to the content, or by a combination thereof.

In a further aspect of the present invention, a server computer for supporting secondary use of content of an electronic work includes use request reception means for receiving, from a user terminal, a use request requesting secondary use of the content of the electronic work, where a secondary use policy of an author or a copyright holder of the electronic work or a manager of the electronic work is associated with the electronic work; policy determination means for determining whether the use request satisfies the secondary use policy; and content transmission means for transmitting, to the user terminal, together with a unique identifier associated with the use request, content of the electronic work based on the determination or edited content based on the determination.

In a further aspect of the present invention, the server computer may further include content editing means for editing content of the electronic work to satisfy the use request and the secondary use policy. In this case, the transmission means may transmit the edited content to the user terminal.

In yet a further aspect of the present invention, the server computer may further include edit permission inquiry means for transmitting, to the author, the copyright holder, or the manager, in response to the use request not satisfying the secondary use policy, an inquiry as to whether editing not satisfying the secondary use policy is to be permitted, and notification reception means for receiving, from the author, the copyright holder, or the manager, a notification to an effect that editing not satisfying the secondary use policy is permitted. In this case, the content editing means may edit the content based on the use request in response to reception, from the author, the copyright holder, or the manager, of the notification to an effect that editing not satisfying the secondary use policy is permitted. Also, in this case, the content transmission means may transmit edited content based on the use request to the user terminal.

In yet a further aspect, the server computer may further include secondary use frequency count means for acquiring a secondary use frequency of the electronic work. In this case, the content editing means may add the secondary use frequency of the electronic work to the content.

In one example, the use request reception means may receive, from the user terminal, a re-edit request requesting re-editing of the edited content, the policy determination means may determine whether the re-edit request satisfies the secondary use policy, and the content transmission means may transmit to the user terminal, re-edited content based on the determination together with a unique identifier associated with the re-edit request.

In one example, the content editing means may re-edit the edited content to satisfy the re-edit request and the secondary use policy.

Further, the edit permission inquiry means may, for instance, transmit, to the author, the copyright holder, or the manager, in response to the re-edit request not satisfying the secondary use policy, an inquiry as to whether re-editing not satisfying the secondary use policy is to be permitted; the notification reception means may receive, from the author, the copyright holder, or the manager, the notification to an effect that re-editing not satisfying the secondary use policy is permitted; and the content editing means may re-edit the content based on the re-edit request in response to reception, from the author, the copyright holder, or the manager, of the notification to an effect that re-editing not satisfying the secondary use policy is permitted.

In one aspect, in a case where a notification to an effect that editing not satisfying the secondary use policy is permitted is already received, the content editing means may re-edit the content based on the re-edit request in response to the re-edit request not satisfying the secondary use policy.

In a further example, the use request reception means may further receive a unique identifier generated at the user terminal. In this case, the unique identifier associated with the use request may be the unique identifier generated at the user terminal or an identifier generated based on this identifier.

The unique identifier associated with the use request may be, for instance, an identifier generated by the server computer in response to reception of the use request, and may be an identifier associated with the received use request.

The use request reception means may further receive, e.g., a unique re-edit request identifier generated at the user terminal. In this case, the unique identifier associated with the re-edit request may be the unique re-edit request identifier generated at the user terminal, or an identifier generated based on this re-edit request identifier.

In one aspect, the unique re-edit request identifier associated with the re-edit request may be an identifier generated by the server computer in response to reception of the re-edit request, and may be an identifier associated with the received re-edit request.

The use request may include, for instance, an attribute of the electronic work, and the attribute may include a document ID, and a secondary use range of content, and optionally, a format.

In one aspect of the present invention, the re-edit request may include an attribute of the electronic work, and the attribute may include a document ID, and a secondary use range of content, and optionally, a format.

In a further aspect of the present invention, the secondary use policy may include availability of secondary use of content, data type, a range allowing secondary use, a format, availability of tertiary or higher use, or a combination thereof.

In yet a further aspect of the present invention, the use request may include a document ID, and an identifier for identifying a secondary use mark by which a right owner of the electronic work attaches a level of secondary use.

In another aspect, the secondary use policy may include an identifier for identifying a secondary use mark by which a right owner of the electronic work attaches a level of secondary use.

In an aspect of the present invention, the content transmission means may transmit, to the user terminal, together with a unique identifier associated with the use request, content of the electronic work based on the determination or edited content based on the determination, and also transmit, to the user terminal, the secondary use mark by which a right owner of the electronic work attaches a level of secondary use.

The server computer may further include, for instance, content examination means for storing the use request, a unique identifier associated with the use request, and content transmitted to the user terminal in response to the use request; receiving a unique identifier and content transmitted from a computer of a third party; determining whether the unique identifier and the content stored coincide respectively with the unique identifier and the content transmitted from the computer of the third party; and determining that secondary use of the content is within a range of the use request when the unique identifier and the content stored coincide respectively with the unique identifier and the content transmitted from the computer of the third party, and if otherwise, determining that the range of the use request is exceeded.

In one example, the content editing means may edit the content by converting the content into an image, omitting a part of the content, transmitting after adjusting a format, deciding a range of secondary use of the content, adding a source to the content, or by a combination thereof.

In a further aspect according to the present invention, a server computer program or a server computer program product for supporting secondary use of content of an electronic work causes a server computer to execute a method according to aspects of the present invention.

A program for a server computer according to an aspect of the present invention may be stored in any one or a plurality of server computer-readable recording media such as flexible disks, MOs, CD-ROMs, DVDs, BDs, hard disk devices, memory media that may be connected to USBs, ROMs, MRAMs, RAMs, and the like. The program for a server computer may be downloaded from another computer connected via a communication line, such as another server computer, or may be copied from another recording medium so as to be stored in the recording medium. Furthermore, the program for a server computer according to an aspect of the present invention may be compressed or divided into a plurality of pieces and be stored in a single or a plurality of recording media. Note that the program product for a server computer according to an aspect of the present invention may, of course, be provided in various modes. The program product for a server computer according to an aspect of the present invention may include a storage medium storing the program for a server computer described above, or a transmission medium for transmitting the program for a server computer, for example.

Various changes such as combining hardware components of the server computer used in a mode of the present invention with a plurality of machines and allocating and executing the functions at the machines may, of course, be readily made by those skilled in the art. These changes are naturally included in the concept of aspects of the present invention. However, these structural elements are only examples, and not all the structural elements are essential structural elements of aspects of the present invention.

Also, aspects of the present invention may be implemented by hardware, software, or a combination of hardware and software. As execution by a combination of hardware and software, execution by a server computer on which the program for a server computer is installed may be cited as a typical example. In such a case, the program for a server computer controls the server computer to execute the process according to an aspect of the present invention, by being loaded into a memory of the server computer and being executed.

The program for a server computer may be consisted of a set of instructions that can be expressed in an arbitrary language, code, or notation. Such a set of instructions enables the server computer to directly execute specific functions, or to execute the process according to aspects of the present invention after one or both of 1. conversion to another language, code, or notation and 2. copy to another medium are executed.

According to an aspect of the present invention, it is possible to provide a user of an electronic work with an environment where secondary use may legitimately be made while satisfying a secondary use policy specified by an author, a copyright holder, or a manager (hereinafter referred to also as "author or the like") of the electronic work, that is, while reflecting the intention of the author or the like of the electronic work regarding secondary use of the electronic work.

According to an aspect of the present invention, in response to a secondary use request from a user terminal, a server computer managing an electronic work edits content of the electronic work according to a secondary use policy specified by an author or the like. Accordingly, the author or the like may prevent, through the server computer, illegal reproduction or unauthorized use of the electronic work, and at the same time, may actively publish the electronic work in a manner allowing secondary use.

According to an aspect of the present invention, it is possible to prove that secondary use of an electronic work is a legitimate secondary use approved by an author or the like, and also, typographical errors or transcription errors at the time of secondary use may be prevented. Accordingly, the burden on the side of the user making secondary use of an electronic work may be reduced.

What is claimed is:

1. A computer-implemented method comprising:
receiving, from a user terminal, a use request requesting use of content of an electronic work, wherein a secondary use policy of an owner of the electronic work is associated with the electronic work, the use request including a document ID of the electronic work and a requested format of the content of the electronic work, the requested format including a font, a size, a color, a background color, a maximum height, a maximum width, and an alignment of the content;
determining that the use request does not satisfy the secondary use policy;
transmitting, to the owner and in response to determining that the use request does not satisfy the secondary use policy, an inquiry as to whether editing that does not satisfy the secondary use policy is to be permitted;
receiving, from the owner, a notification that editing the electronic work is permitted;
editing, in response to receiving the notification that editing the electronic work is permitted, the content based on the use request to create edited content, wherein the editing includes:
  determining, from the use request, the requested format of the content of the electronic work;
  modifying the content of the electronic work such that a format of the modified content matches the requested format;
  converting the modified content into a file type that does not allow further text editing of the modified content;
transmitting, to the user terminal, together with a unique identifier associated with the use request, the edited content of the electronic work;
receiving, from the user terminal, a re-edit request requesting re-editing of the edited content;
determining that the re-edit request does not satisfy the secondary use policy;
transmitting, to the owner and in response to determining that the re-edit request does not satisfy the secondary use policy, an inquiry as to whether re-editing that does not satisfy the secondary use policy is permitted;
receiving, from the owner, a notification that re-editing the electronic work is permitted;
re-editing, in response to receiving the notification that re-editing the electronic work is permitted, the edited content to satisfy the re-edit request and the secondary use policy;
transmitting, to the user terminal, the re-edited content together with a unique identifier associated with the re-edit request; and
embedding, by the user terminal, the re-edited content into a document being created by the user terminal.

2. The computer-implemented method according to claim 1, further comprising acquiring a secondary use frequency of the electronic work; and wherein the editing further includes adding the secondary use frequency of the electronic work to the content.

3. The computer-implemented method according to claim 1, wherein the receiving the use request from the user terminal further includes receiving a unique identifier generated at the user terminal; and
  wherein the unique identifier associated with the use request is the unique identifier generated at the user terminal or an identifier generated based on the unique identifier generated at the user terminal.

4. The computer-implemented method according to claim 1, further comprising:
  storing the use request, the unique identifier associated with the use request, and content transmitted to the user terminal in response to the use request;
  receiving a unique identifier and content transmitted from a computer of a third party;
  determining whether the unique identifier and the content stored coincide respectively with the unique identifier and the content transmitted from the computer of the third party; and
  determining that secondary use of the content satisfies the use request based on the unique identifier and the content stored coinciding respectively with the unique identifier and the content transmitted from the computer of the third party.

* * * * *